(12) United States Patent
Michelin

(10) Patent No.: US 9,043,265 B2
(45) Date of Patent: May 26, 2015

(54) METHODS AND SYSTEMS FOR CONSTRUCTING INTELLIGENT GLOSSARIES FROM DISTINCTION-BASED REASONING

(75) Inventor: Philippe Michelin, Paris (FR)

(73) Assignee: AEBIS, INC.

( * ) Notice: Subject to any disclaimer, the term of this patent is extended or adjusted under 35 U.S.C. 154(b) by 491 days.

(21) Appl. No.: 13/487,308

(22) Filed: Jun. 4, 2012

(65) Prior Publication Data

US 2012/0265724 A1 Oct. 18, 2012

Related U.S. Application Data

(63) Continuation-in-part of application No. 13/012,514, filed on Jan. 24, 2011, now Pat. No. 8,229,878, which is a continuation of application No. 11/851,409, filed on Sep. 7, 2007, now Pat. No. 7,945,527.

(60) Provisional application No. 60/826,513, filed on Sep. 21, 2006.

(51) Int. Cl.
*G06N 5/02* (2006.01)
*G06F 17/27* (2006.01)

(52) U.S. Cl.
CPC .............. *G06F 17/2785* (2013.01); *G06N 5/02* (2013.01); *G06F 17/2735* (2013.01)

(58) Field of Classification Search
CPC ...................................................... G06N 5/02
USPC ...................... 706/12, 55; 708/231
See application file for complete search history.

(56) References Cited

U.S. PATENT DOCUMENTS

| | | | |
|---|---|---|---|
| 4,967,368 A | 10/1990 | Bolling | |
| 6,120,297 A | 9/2000 | Morse | |
| 6,708,311 B1 * | 3/2004 | Berstis | .......................... 715/206 |
| 7,136,876 B1 | 11/2006 | Adar | |
| 7,254,773 B2 * | 8/2007 | Bates et al. | ................... 715/256 |
| 7,536,297 B2 | 5/2009 | Byrd | |
| 2003/0088543 A1 * | 5/2003 | Skeen et al. | ...................... 707/1 |
| 2004/0205672 A1 * | 10/2004 | Bates et al. | ................... 715/533 |

(Continued)

*Primary Examiner* — Alan Chen
*Assistant Examiner* — Ola Olude Afolabi
(74) *Attorney, Agent, or Firm* — Jennifer Meredith, Esq.; Meredith & Keyhani, PLLC

(57) ABSTRACT

A computer implemented method of constructing formal definitions in intelligent glossaries for interpreting text, comprising the steps of: providing at least one Distinction having a Boundary, an Indication, a Counter-indication and a Frame; modeling each Distinction as a diagram to provide a Distinction Model; verifying each distinction model as being an instantiation of a generic Distinction Pattern; providing at least one Arrangement made of nonintersecting Marks of Distinction containing Indications from the verified Distinction Model; writing at least one Formulation for each Indication appearing in verified Distinction model and Arrangement, providing well-founded Indications; calculating precise Formulations in Natural Language from well-founded Indications by substituting Variables symbols and/or replacing Constants symbols to transform imprecise Formulations into precise Formulations; selecting a Definition type and embedding at least one precise Formulation and Definition type as a formal Definition in an Intelligent Glossary to provide computerized Semantic Systems of Intelligent Glossaries.

24 Claims, 19 Drawing Sheets

(56) References Cited

U.S. PATENT DOCUMENTS

| | | | |
|---|---|---|---|
| 2004/0225999 A1* | 11/2004 | Nuss | 717/114 |
| 2005/0097628 A1 | 5/2005 | Lussier | |
| 2005/0234709 A1* | 10/2005 | Klavans et al. | 704/10 |
| 2006/0069558 A1* | 3/2006 | Beattie et al. | 704/235 |
| 2006/0074980 A1* | 4/2006 | Sarkar | 707/104.1 |
| 2006/0106824 A1* | 5/2006 | Stuhec | 707/100 |
| 2007/0011160 A1* | 1/2007 | Ferland et al. | 707/6 |
| 2007/0162465 A1* | 7/2007 | Cope | 707/100 |

* cited by examiner

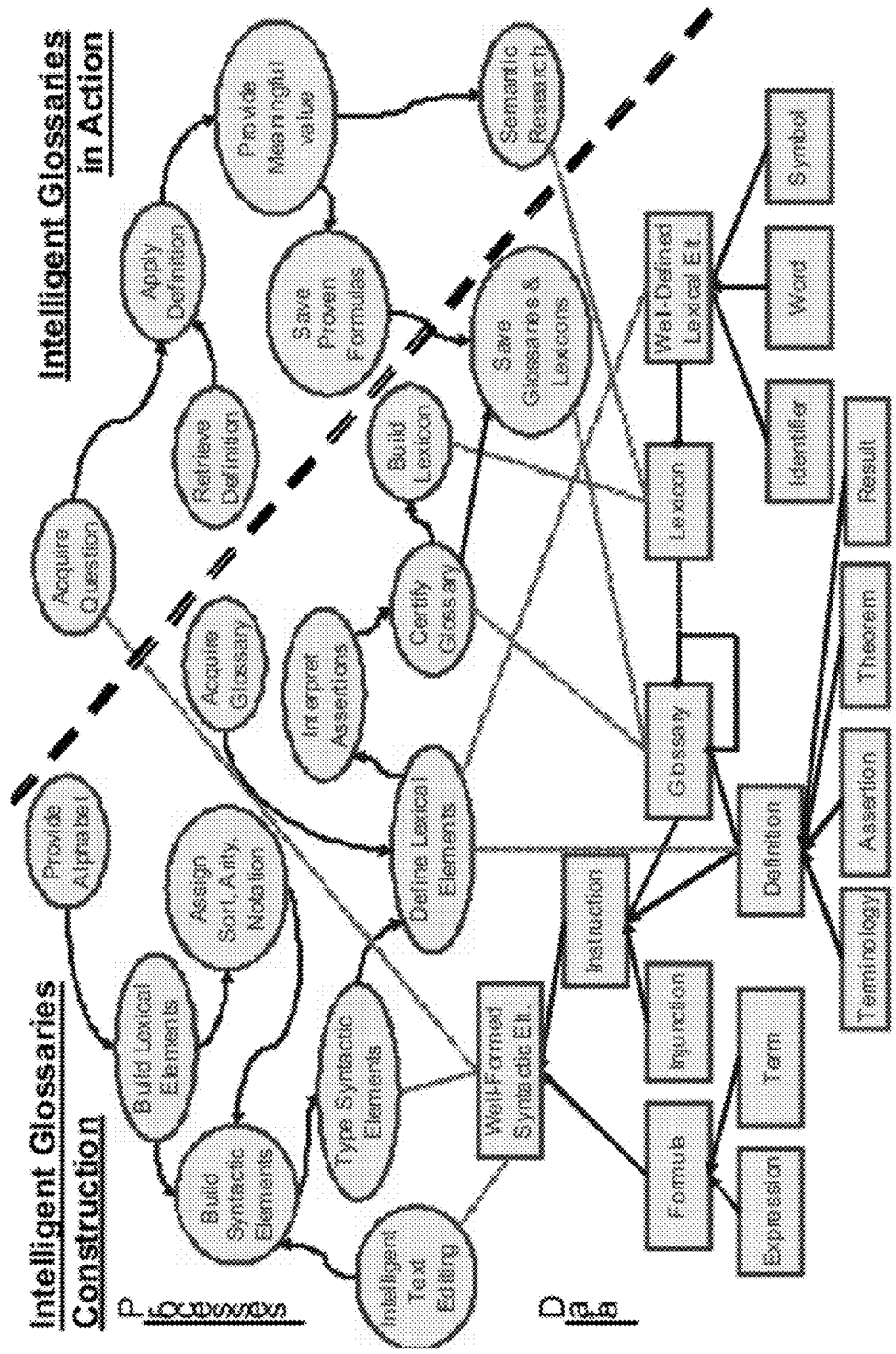
Figure 3: Bird view of Model Elements – Data & Processes – of method and system

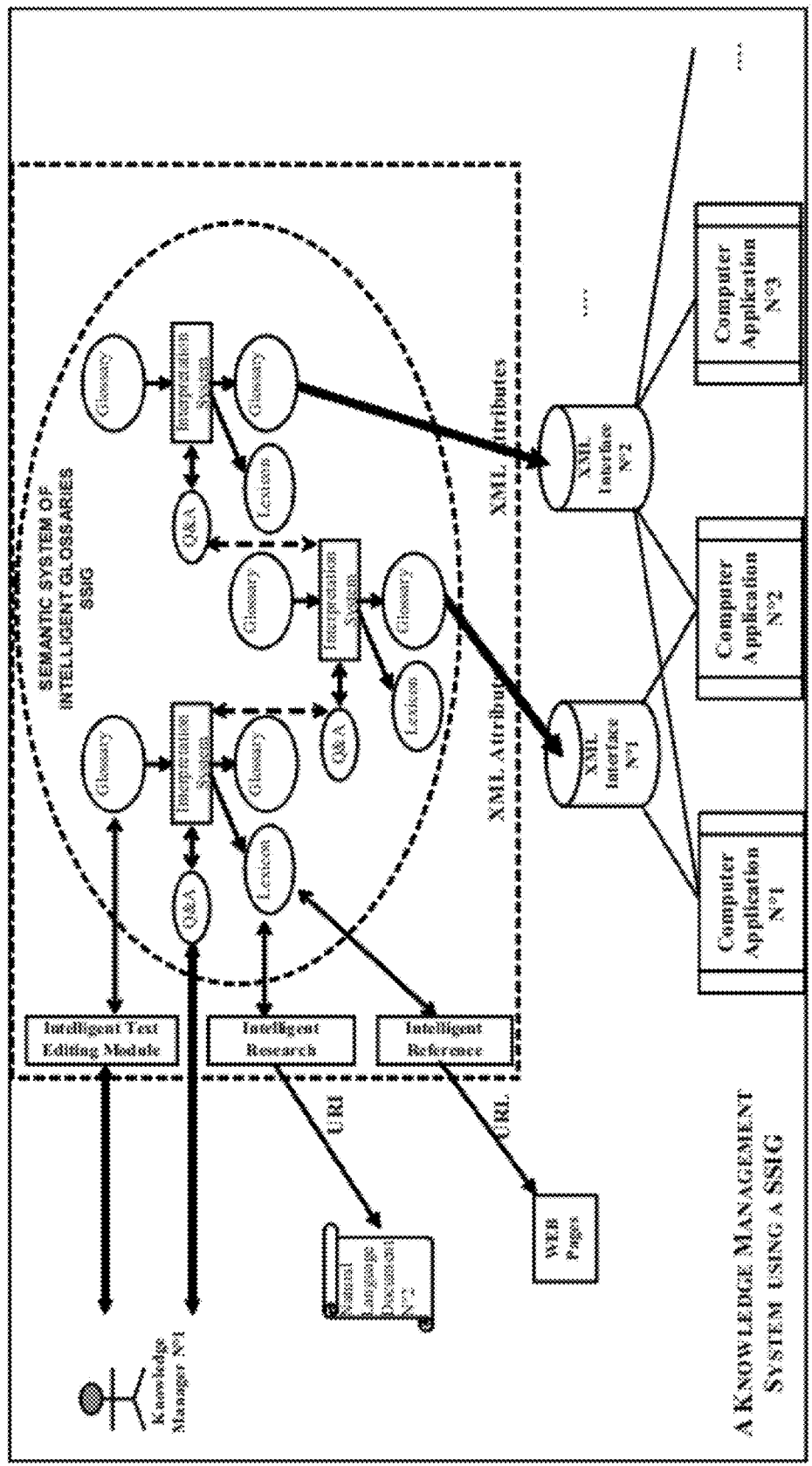
Figure 4: A Knowledge Management System based on a SSIG

Textual Notations:
- LoF is Laws of Form of George Spencer Brown (GSB);
- Int denotes the set of positive Integers, ie Int = {0, 1, 2, 3...};
- Bool = {True, False}; ∧ is the logical connector "And" (conjunction); ∨ is the logical connector "Or" (disjunction);
- $(a_1, a_2, a_3, ..., a_n)$ is an n-tuple; $P_i$ () is the ith projection on n-tuples; ex: $P_1((a_1, a_2)) = a_1$;
- String denotes the set of all strings of symbols built over the method's alphabet; $=_{syn}$ denotes the syntactical equality of String: "$x =_{syn} y$" means that x and y are the same string of symbols; "" is the empty string;
- LoF Primary symbols are: @ (Arobas), ⊥ (Space), [] (Cross);
  ○ Primary symbols used singly are "The Primary values";
  ○ Primary symbols are polymorphic, i.e. they can have either Truth or Reality values;
  ○ Primary symbols can be used either as operators, or as operands;
- Variables are standalone upper-case letters;
- Words are strings of lower-case letters; they have Fixed Non-Numerical Reality values;
- Numbers are strings of digits, they have Fixed Numerical Reality values;
- Arrows are writings of primary values, words, number or other Arrows, separated by a "⇝" (Rightwards Wave Arrow); ex: 1 ⇝ 2; they have Changing values (Truth or Reality);
- Elements are: Primary Values, Numbers Words and Arrows;
- Formulas are formal construct built out of Elements, Symbols, and Variables; Formulas are sub-typed as Expressions (which have Truth-values, Fixed or Changing) and Terms (which have Reality-values, Fixed or Changing);
- A Ground formula is a formula with no free variables;
- A Primary Formula is a non-ground Formula containing only Primary Symbols and Variables;
- A Literal is a Formula containing only Primary symbols and Elements; Literals are noted by l, l', l";
- A Literal is irreducible if it is equal to its normal form according to LoF rewriting rules;
- Bunches are Literals built with LoF Space Operator upon Elements, Arrangements are Literals containing only LoF primary symbols;
- Variables are assigned content by means of substitution (or unifiers): "v:=f" means that the variable v is substitutable by the formula f;
- A substitution is a finite mapping from variable to formulas, which is written:
  $\Theta = \{v_0:=f_0, v_1:=f_1, ..., v_{n-1}:=f_{n-1}\}$ where
  ○ ■ $f_0, f_1, ..., f_{n-1}$ are Formulas; and
    ■ $v_0, v_1, ..., v_{n-1}$ are are variables (i.e. domain of $\Theta$);
  ○ Giving a Formula f, and a substitution $\Theta$, $f\Theta$ stands for the result of applying $\Theta$ to f, which is obtained by simultaneously replacing each occurrence in f of a variable vi from the domain of $\Theta$, the corresponding formula in $\Theta$, fi;
  ○ Substitutions can be composed, and the composition operator denoted by \ is associative: $(f\backslash\Theta_0)\Theta_1 = f\backslash(\Theta_0\Theta_1)$;
- A Variable vi can be turned temporarily into a unique Pseudo-constant this is noted by an underlined variable: $\underline{v_i}$;
  ○ Pseudo-constants are only unifiable with themselves and cannot appear in the domain of a substitution;
  ○ Pseudo-constants are used for transferring properties by temporary glossaries;
- Formulas of binding in a substitution $\Theta$ can be deactivated by the quote function '$\Theta$':
  ○ If $\Theta = \{v_0:=f_0, v_1:=f_1, ..., X_{n-1}:=f_{n-1}\}$ Then '$\Theta$'= $\{v_0:='f_0', v_1:='f_1', ..., v_{n-1}:='f_{n-1}'\}$;
  ○ Deactivated Formulas are parsed and unified as an ordinary Formula; but they are considered as constant Term, by switching the type of all their variables, to "Pseudo-constant";
- Definitions are formal constructs in the form of "$a_n \cdot b_n \approx c_n$", in which $a_n, b_n;$ and $c_n$ are Formulas;; they are noted by dn, where n= Int; $a_n$ is the precondition of the definition; $b_n$ is the indicative part of they definition; and cn is the body of the definition;

FIG. 5A

- Glossaries are ordered sets of Definitions; when applying a glossary, all definitions retrieved in the glossary are used "Last In First out"; the last definition in the glossary is the first definition applied;
- There are 4 types of definition: Terminology, Assertions, Theorems, Questions and Answer; these types are sub-typed in sub-types of definition, as follows.

| Sub-types \ Properties of Definition \ | Ground ? | Pre-condition | Indicative part | Body | Comments |
|---|---|---|---|---|---|
| 1 - Terminology | No | Any Expression | Atomic | Any Formula | |
| 2 - Recursive Terminology | No | Any Expression | Atomic | Any Formula in which the indicative part of a recursive terminology appears | |
| 3 - Hard-coded Terminology | No | Any Expression | Atomic | Hard-coded Formula | |
| 4 - Parameterized Terminology | No | Any Expression | Atomic, with constants | Hard-coded Formula | |
| 5 - Assertion | Yes | [] | Atomic | [] | *Generalized as "Generic Assertion"* |
| 6 - Anti-Assertion | Yes | [] | Atomic | ⊥ | *Generalized as "Generic Assertion"* |
| 7 - Term-Assertion | Yes | [] | Atomic | Number, Word, Arrow | *Body is Non Primary Irreducible Literal* |
| 8 - Theorem | No | [] | Non Atomic | [] | *Generalized as "Generic Theorem"* |
| 9 - Anti-Theorem | No | [] | Non Atomic | ⊥ | *Generalized as "Generic Theorem"* |
| 10 - Primary Theorem | No | Primary Expression | Primary Expression | Primary Expression | |
| 11 - Question without precondition | Yes | [] | Any ground Formula | @ | *Body have to be Computed by the Method* |
| 12 - Question with precondition | No | Any Non-Ground Expression | Any Non-Ground Expression | @ | *Body have to be Computed by the Method* |
| 13 - Answer of Question without precondition | Yes | [] | Any ground Formula | Irreducible Literal | *Body have to be Computed by the Method* |
| 14 - Answer of Question with precondition | No | [] | Logical Implication | [] | *Body have to be Computed by the Method* |

- FCA Mode Parameters:
    - Undefinedness Mode:
        - p = 0 - Evaluation Mode
            - All undefined indications are changed s are changed to @;
            - This mode is used for applying terminologies to a question without preconditon, to produce a ground Result, possibly undefined (@);
            - Undefined indication and not computable hard-coded indications are valuated as @; all other (well Defined) indications are applied;
        - p = 1 - Evaluation Mode
            - All undefined indications are not changed to @;
            - This mode is used for inserting assertions or theorems into a glossary, in order to produce new assertions;
            - hard-coded terminologies are not applied;
            - Undefined and recursive indications remain "as is";

FIG. 5B

- p = 2 - Normalization Mode;
  - All undefined indications are not changed to @;
  - This mode is used for normalizing the formulas of a definition;
  - Parameterized Terminologies are not applied;
  - Undefined, recursive and quantified indications are not changed and remain "as is";
  - Preconditions are deactivated, by the quote function, before evaluation.
- Filtering Mode:
  - o = 0 - No filtering;
  - o = T - Use Generic TheoremFiltering:
    - This mode is used for respecting a Generic Theorem in a glossary, in order to produce new assertions;
    - Only assertions type definition are applied;
    - The filtering rules are:
      Rule 1. A given assertion can only be applied once to a Generic Theorem;
      Rule 2. All variables of a given Generic Theorem must be valued
         by the glossary's assertions (No Sub-theorems);
      Rule 3. A variable in a Generic Theorem has only one value: All
         substitutions must be compatible by composition.
- Answering Mode:
  - r = @ - Compare Results
    - All results must be the same; otherwise, @ is restituted;
  - r = [] - Conjunct Results:
    - In case of multiple results their conjunction is produced as a unique combined answer;
  - r = ⊥ - Disjunct Results:
    - In case of multiple results their conjunction is produced as a unique combined answer;
- Strategy Mode:
  - s = 0 - Top Down:
    - The definitions applicable to a formula are ordered from the root of that formula, down to its leaves, from left to right;
  - s = 1 - Bottom Up:
    - The definitions applicable to a formula are ordered from the leaves, from left to right, up to the root of that formula without skipping nodes.
- Result is the output of FCA algorithm (Result ⊆ String x String;
- &x is the Name of x;
- Return Function:
  - This function manages the Recursion Call Stack; and
  - The Exit Function.
- Message Function: Message(c:int, f:Formula, g:Glossary, d:Definition):String;
  - If c = 0 then Return("Value calculation of formula" f "by Glossary" &g "is meaningful");
  - If c = 1 then Return("At least one Lexical Element contained in formula" f "is Undefined in Glossary" &g);
  - If c = 2 then Return("At least one Lexical Element contained in formula" f "has only non-applicable definitions in Glossary" &g);
  - If c = 3 then Return("Preconditon of Definition" d "in Glossary" &g "is undefined with Formula" &f);
  - If c = 4 then Return("Multiple answers by applying Glossary" &g "to formula" &f);
- Sort Function: Sort(l:Literal):Literal;
  - This function sorts the literal according to the String order; example: (1 2 3 2 1 1 1 1) is changed into (1 1 1 1 1 2 2 3);

FIG. 5C

```
Add Definitions(g: Glossary): Glossary
g = syn(d_1, d_2, ..., d_n, ..., d_N) where d_n = syn a_n | - b_n ≈ c_n
a_n ← Reduce(a_n); b_n ← Reduce(b_n); c_n ← Reduce(c_n)
g_0 ← g
For n = 1 to N
g ← (g - d_n)
If (d_n is a Terminology) Then
        (a, θ) ← Switch Type(a); c ← c_n\θ
        g' ← ERA(a, [], g, 2, 0 @)
        c ← FCA(c, g', 2, 0, @, 0)
        (a, θ) ← Sitch Type(a); c ← c\θ
        g ← Insert Definition({a| - b_n ≈ c}, g))
End If    // End of Terminology //
If (d_n is an Generic Assertion) Then
        ERA(b_n, c_n, g, 1, 0, c_n)
        g ← Insert Definition({d_n}, g))
End If    // End of Assertion //
If (d_n is a Generic Theorem) Then
        b' ← FCA(b_n, g, 2, T, c_n, 0)
        ERA(b_n, c_n, g, 1, T, c_n)
        g ← Insert Definition({[] - b' ≈ c_n }, g)
End If    // End of Theorem //
If (d_n is a Question) Then
        c' ← FCA(b^1, g, 0, 0, @, 0)
        If (c' ≠_syn @) Then
        g ← Insert Definition({[] - b_n ≈ c'}, g))
End If    // End of Question //
If (d_n is a Question with Precondition) Then
        (a, θ) ← Switch Type(a_n); b FCA(b ← b_n\ θ
        g' ← ERA(a, [], g, 1, 0, @)
        If (FCA((b, g', 0, 0, @, 0) = []) Then
        (a, θ) ← Switch Type(a); b ← b\θ
        g' ← Insert Definition({[] - a → b ≈ []}, g)
End If    // End of Question with Precondition //
If (d_n is another Type of Definition) Then
        b_n ← FCA(b_n, g, 2, 0, @, 0)
        g ← Insert Definition({d_n}, g)
End If    // End of other Type of Definition //
End For
Return(g)
```

← Entry Point

FIG. 7A

METHODS AND SYSTEMS FOR CONSTRUCTING INTELLIGENT GLOSSARIES FROM DISTINCTION-BASED REASONING

This application is a continuation-in-part of application Ser. No. 13/012,514 filed Jan. 24, 2011 now U.S. Pat. No. 8,229,878, which is a continuation of application Ser. No. 11/851,409 filed Sep. 7, 2007 (now issued as U.S. Pat. No. 7,945,527) which in turn claims priority to provisional patent application No. 60/826,513 filed Sep. 21, 2006 both entitled "Methods and systems for interpreting text using intelligent glossaries", the entire contents of each are incorporated herein by reference.

BACKGROUND OF THE INVENTION

The present invention has been specifically developed to tackle the problem of synthesizing, representing and transferring knowledge up to mutual understanding in a domain, field of endeavor or activities. The terms "domain", "knowledge domain", "field", "line of business" and "corporate activities" are used synonymously. As Knowledge is "in the mind" of human beings, and not in documents, networks or machine, we do not address the topic of communication and information technologies or document technologies currently in use on the Internet or other computerized networks. We focus on the core knowledge carried by human actors in a domain, which knowledge is ultimately only accessible through the specialized language used by these actors in their day-to-day work activities. With regard to a Domain in a Company, diagramming representation methods have been used for years in learning, brainstorming, visual thinking, and problem solving by educators, engineers, psychologists, and consultants. Here is an overview of main diagramming methods.

A Concept Map is a "Box and arrow" diagram, in which ideas are represented as boxes and the relations between ideas as Arrows. In cases of Arguments mapping, boxes represent propositions to focus on the inferential relationships among propositions. A concept map is used for organizing and representing knowledge. An industry standard that implements formal rules for designing at least a subset of such diagrams is the Unified Modeling Language (UML).

A mind map, popularized by Tony Buzan, is a diagram used to represent words, ideas or other items linked to and arranged around a central key word or idea. The branches of a mindmap represent hierarchical tree structures denoting relationships with a central idea.

The Semantic Web, led by the World Wide Web Consortium, is dedicated to computers not to human beings; it could permit data to be shared and reused across computer applications by using common formats and including semantic metadata in web pages. But the Semantic Web will not permit knowledge transferring between human beings.

In the current state of the art, there are only informal methods for representing and mapping "what is in human mind": existing method and tools cannot be formalized up to prove truth or falsity of "what they represent". There is no way to bridge the gap between human reasoning and machine computation and data processing that is a limit to development of formal ontology and Semantic Web.

Our focus is on experience-based knowledge in a business domain embodied in people, called "The Experts", who able to quickly apprehend a complex situation and come to a rapid and wise decision. There is no free access to expert's knowledge, as they don't (or can't) explain "How they reason"; sometime, they don't always want to reveal their data: "Information is power"! Heavyweight reporting, processes modeling, or rule-based management are not suitable solutions for managing "language assets".

The present invention provides computational reasoning and methods for establishing and maintaining the content of formal glossaries, known as intelligent glossaries. Intelligent glossaries, are also described in U.S. Pat. No. 7,945,527. The present invention provides computational methods and systems for providing terminological precision, with regards to existing knowledge management capabilities, to model essential knowledge carried by human actors in a field of endeavor, line of business, activity or domain. The highly accurate methods and systems guarantee coherence and completeness of Semantic System of Intelligent Glossaries (SSIG) and enables the development of formal automatic interpretation of glossaries by a machine, for validating these glossaries by answering formal questions. The systems and methods as disclosed herein focus on the essential knowledge carried by human actors in a domain, whose knowledge is ultimately only accessible through the specialized language used by these humans in their day-to-day work activities. By way of example, legal documents may contain numerous idioms that the average person may not understand. The systems and methods described herein would tackle this problem by providing the user with a non-ambiguous definition for key terms, identifiers and symbols that are known within the legal field and providing them to the user in traditional jargon or language.

Several approaches to the concept of definition exist, based on mathematical, logical or data processing practices such as:
  Providing a shortened but equivalent linguistic construction by mechanisms of abbreviation and acronym;
  Using a meaningful mathematical or logical symbol equivalent to a term, which guarantees 100% identification of that term in any text in a natural language;
  Enumerating the properties of an object or a concept to be defined;
  Separating two complementary aspects of an object or a concept to be defined:
    1. "Black Box" perspective (inputs, outputs); and
    2. "White Box" perspective (with exhaustive enumeration of the content of the Box).
  Studying linguistic relations like synonymy, antonymy, hyponymy and hyperonymy to build semantic nets of word meanings.

Existing technologies including Description logics, Ontology, and Fuzzy logic are used to automate terminology. Currently, these technologies are not generally accessible and remain the province of computational linguistic specialists and researchers.

Description logics and ontology is the current state of the art. The purpose of ontology is to create a representation of the world, as well as the rules for combining representation elements to define ontological extensions. Such methods use first-order logic and set theory for knowledge modeling. For all practical purposes, description logics defines concepts and the relations between these concepts. In this approach, what is described is necessarily a set; set inclusion is the basic mechanism for inferring knowledge and ontological extensions; concepts are modeled as subsets of elements of the universe of discourse. An Ontology classifies concepts in accordance with the inclusion relation, which is well adapted to the definition of the vocabulary of a hierarchical environment (nomenclature). Ontology is a centralized data base for sharing knowledge; but there is no formal language for solving interpretation issues between two different ontology knowledge bases. As a result, Description logics is limited given the complexity of natural languages, which can refer to a variety of concepts and documents that are produced in a dynamic and decentralized way.

Fuzzy logic uses a translation mechanism of natural language sentences into a generalized language of numerical constraints. For example, in the sentence "almost all Swedes are tall", the word almost means 80%, while the remainder of the sentence "all Swedes are tall" is a statement, which can be formalized as a constraint. This theory is ambitious; it tackles real problems and covers a vast array of concepts, but it is still under development.

Practices currently used to address terminology include lexicons, glossaries and dictionaries. A lexicon is a list of words, symbols or identifiers dedicated to a field of endeavor. A word, symbol or identifier listed in a lexicon is called a lexical element. A glossary is a document encompassing the definitions of the lexical elements included in a lexicon. Therefore, a glossary is not a dictionary, because it does not include the definitions of all the possible meanings of the same word; on the contrary, a glossary shows only the meaning agreed upon for a specific field.

Throughout the practice of generalizing and formalizing glossaries, the Essential Knowledge dilemma arises between: size of lexicon, on the one hand, and precision of words in natural language, on the other hand; in essence: If the concept of words with multiple meanings found in natural language is fully addressed, then much knowledge on a vast number of topics can be expressed. However, it requires a massive amount of documentation that remains vague and therefore not usable by a machine; if the word meaning is restricted and specified by using a formalized language, then a very precise, focused knowledge can be expressed. However, it is ultimately purely symbolic and machine readable; but it is only understood by experts in the field and in the formal language used; moreover, this no longer provides a useful global vision of the field.

Existing knowledge management methods and technologies do not address the Essential Knowledge dilemma and many questions arise: where to stop, given the combinatorial explosion of any terminology (to define a word, it is necessary to use other words)? What is really represented with each word? How is ambiguity eliminated in the meanings? The present invention was developed to help users solve these problems and the Essential Knowledge dilemma.

The present invention may apply Laws of Form (LoF), a mathematical theory created by George Spencer Brown, to lexical semantics; LoF is both a mental calculus (the Calculation of Distinctions), and a formal planar system (the Calculus of Indications). The LoF Calculation of Distinctions constrains the knowledge manager to conduct a comprehensive up-front Distinction-Based Reasoning (DBR), before writing a definition in a glossary; the LoF Calculus of Indications is used for computing formal meaningful values, i.e. the value of meaning of formal sentences, imbedding words and other lexical elements, which result from DBR analysis.

The present invention may formalize the glossary practice up to the capability of self-reference, i.e. the capability of formal self-definition, is reached; the present computer implemented method can then be re-used to formalize:
the syntax of alphabet, formulas and instructions authorized;
the application of a set of instructions to a formula;
the interpretation of the application of a set of instructions; and
the computation of the answer to a question, by interpretation of the application of a set of instructions to the question considered as a formula.

The present invention treats words as first class citizens—i.e. as numbers or other mathematical beings—which solves the previously described:
1. limit of ontology for describing non-numerical meaning, while being fully consistent with existing definitions of numbers, sets and first order logical languages;
2. basics of terminological precision, by producing intelligent glossaries, which are formal glossaries certified in accordance with the semantic interpretation of the process itself using the self-reference capability;
3. size of lexicon and precision of words by eliminating all computable meanings (compound words, opposite words, union of words, words hyponymy, . . . ).

The present invention allows automatic generation of a Minimal Lexicon from an Intelligent Glossary; such a lexicon is the smaller set of words for delimiting the field of endeavor of that glossary, which solves the Essential Knowledge dilemma. The present invention has been specifically developed to tackle the problem of synthesizing, representing and transferring knowledge up to mutual understanding in a domain, field of endeavor or activities.

SUMMARY OF THE INVENTION

The present invention relates generally to systems and methods for knowledge management in a field based on the relevant semantics, by definition of words' meaning as precisely as numbers or other mathematical objects; and particularly to systems and methods for: knowledge modeling, computer aided translations, intelligent Web research, and computer-aided human-reasoning.

According to one embodiment of the present invention, a computer implemented method of constructing formal definitions in intelligent glossaries for interpreting text is provided, comprising the steps of: providing at least one Distinction, wherein each Distinction has a Boundary, an Indication, a Counter-indication and a Frame; modeling each Distinction as a diagram to provide a Distinction Model; verifying each distinction model as being an instantiation of a generic Distinction Pattern to provide a verified Distinction Model; providing at least one Arrangement, wherein each Arrangement is made of nonintersecting Marks of Distinction containing Indications from the verified Distinction Model; writing at least one Formulation for each Indication appearing in the verified Distinction model and Arrangement, providing well-founded Indications; calculating precise Formulations in Natural Language from well-founded Indications by substituting Variables symbols and/or replacing Constants symbols to transform imprecise Formulations into precise Formulations; selecting a Definition type, wherein the Definition type is selected from the group consisting of Terminologies, Assertions, and Theorems; and embedding at least one precise Formulation and Definition type as a formal Definition in an Intelligent Glossary to provide computerized Semantic Systems of Intelligent Glossaries.

These and other features, aspects and advantages of the present invention will become better understood with reference to the following drawings, description and claims.

BRIEF DESCRIPTION OF THE DRAWINGS

FIG. 3 depicts Model Elements—Data and Processes;

FIG. 4 depicts a Knowledge Management System based on a SSIG;

FIGS. 5A, 5B, 5C and 5D depict the notations used for describing algorithms.

FIGS. 7A, 7B and 7C depict the Add Definition Algorithm (ADA); and the Equation Resolution Algorithm (ERA).

FIG. 16 depicts an example in which a distinction is made between a good and service.

DETAILED DESCRIPTION OF THE INVENTION

Figure 1:
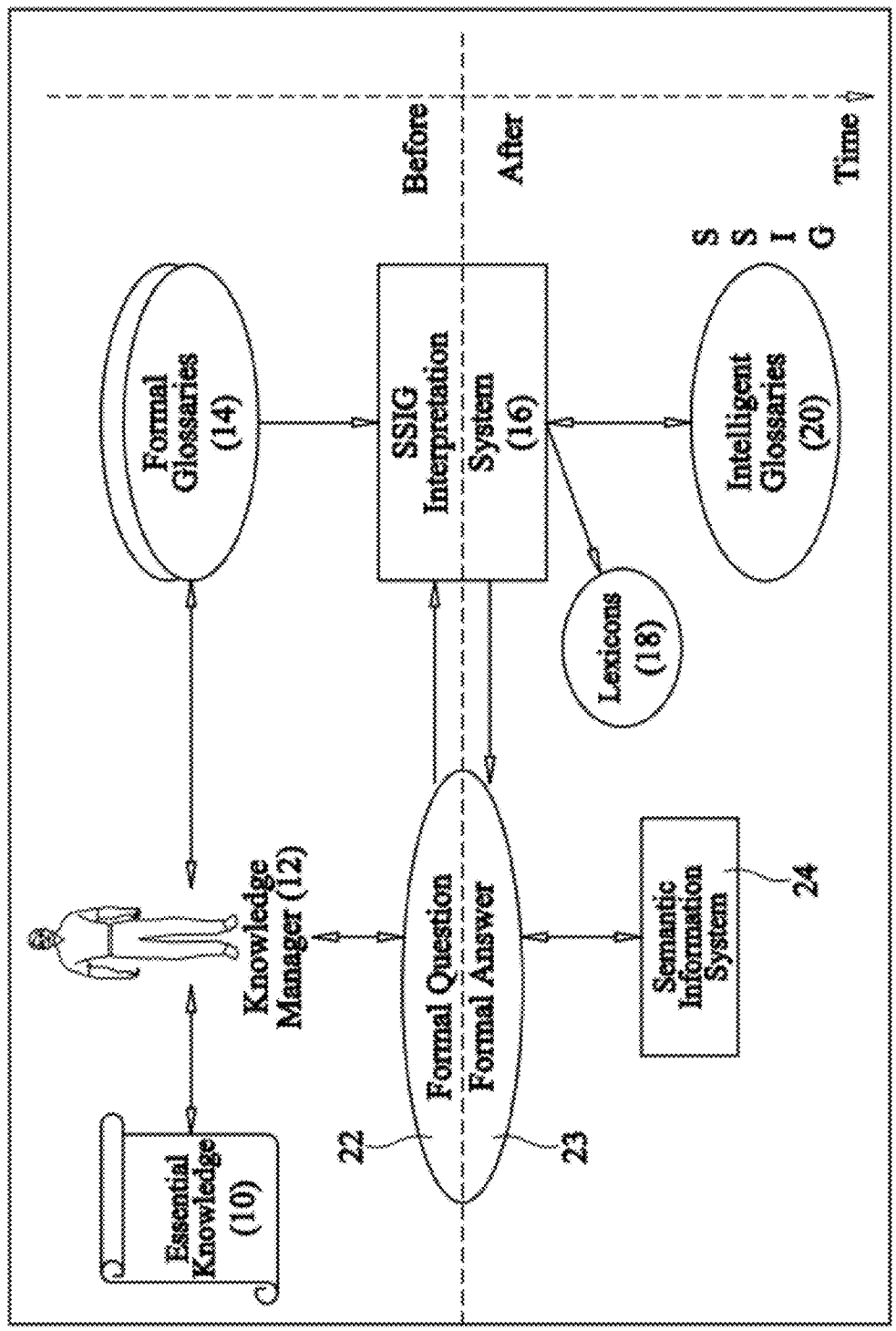
FIG. 1 depicts the Synopsis of a Semantic System of Intelligent Glossaries (SSIG) according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims. The computer-implemented method uses the Laws of Form (LoF) Calculus of Indications, a mathematical theory created by George Spencer Brown, for computing on the forms resulting from distinctions made by human actors; forms represent words meaning. The LoF Calculus of Indications is a pure formal system and would be appreciated by those with skill in the art. In accordance with the LoF Convention of intention: the intent of a symbol or chain of symbols is limited to the use allowed to it; in other words, what is not allowed is forbidden. The LoF Calculus of Indications brings both Arithmetic Laws and Algebraic Initials that support several mathematical interpretations:

1. Boolean logics:
   LoF Calculus of Indications was initially interpreted for Boolean logics by George Spencer Brown;
   Boolean logics is used for computing the truth value of Formal declarative sentences;
2. Ternary logics:
   LoF Calculus of Indications was extended by Francisco Varela to introduce a third Truth Value, to encompass the occurrence of self-referential situations, which entails the abandonment of the Law of excluded middle;
   Ternary logics is used for computing the truth value of formal interrogative sentences; and for processing cycles of computation;
3. Bunch Theory:
   LoF provides an arithmetic to Bunch Theory developed by Eric C. R. Hehner; a bunch is not a set: a bunch is an unordered and unpackaged collection of elements, which allows duplication of elements; bunches are used to define sets by their content;
   Bunch Theory is used for computing the multiple reality values of formal naming sentences;
4. Category Theory:
   LoF Calculus of Indications extended to Bunch Theory can itself be extended to encompass the Category Theory, which was introduced by Eilenberg and Mac Lane to formalize transformations between mathematical objects sharing the same structure;
   Category Theory is used for computing upon changing values (either truth or reality values) of formal functional sentences; and to formalize the computation process itself.

The computer-implemented method uses Arithmetic and Algebraic Mechanisms, together with the LoF Calculus of Indications; in the present document, the following algebraic notations are used:

the Greek Letters ($\alpha, \beta, \gamma, \delta, \phi, \kappa, \eta, \omega, \nu, \sigma, \ldots$) refer to any symbol or chain of symbols;

The formal Arithmetic and Algebraic writings are:

Packaging a symbol or a chain of symbols is writing it with a left "[" on its left, and a right "]" on its right; for example:
Packaging the chain of symbols "me" is writing the Package "[me]";

Calling 2 symbols or chains of symbols is writing them separated by a space; for example:
Calling the 2 chains of symbols, "me" and "too", is writing the Call "me too";

Changing a symbol or chain of symbols into another symbol or chains of symbols, is writing them separated by a "$\rightsquigarrow$" (Rightwards Wave Arrow):
"$\rightsquigarrow$" stands for the words "is changed to", i.e. "$\alpha \rightsquigarrow \beta$" means "$\alpha$ is changed to $\beta$";
the arrow indicates the direction of the change: $\alpha$ is the source; $\beta$ is the target;

Rewriting a symbol or a chain of symbols is changing it by replacing whole or part of it, in accordance with a Rewriting Rule; for example, a Rewriting Rule of equivalence can be written as a 2-sides equation:
The left side, and the right side of that equation have the same value;
In any symbol or chain of symbols in which the left side of the equation appears, it can be rewritten "on the spot" into that symbol or chain of symbols by the right side of the equation, without changing the value of the symbol or chain of symbols.

According to one method, a computer implemented method of determining the meaning of formal language constructs occurring in written texts is provided, the method comprising the steps of: providing an Alphabet and a set of Symbols for constructing Lexical Elements, and Syntactic Elements built on the Alphabet, Lexical Elements, and Symbols; determining a Sort of Value, an Arity, a Notation, and a Type for each Syntactic Element, to provide Well-Formed Syntactic Elements and meaningless syntactic elements; building Formal Definitions from the typed Well-Formed Syntactic Elements, and determining a type for each definition to provide a list of Terminologies, Assertions, Theorems, Questions and answers; and building Formal Glossaries as ordered sets of Formal Definitions; providing to an actor at least one Formal Glossary, and its related Minimal Lexicon; parsing, verifying and normalizing each Formal Definition from the Formal Glossary, to provide a list of Defined Lexical Elements and undefined lexical elements; allowing an actor to refer, search, cluster or select written texts, from Defined Lexical Elements contained within Minimal Lexicons and appearing within the written texts; acquiring questions from an actor, wherein each question is a set of formal texts containing at least one Well-Formed Syntactic Element; parsing, verifying and normalizing each Well-Formed Syntactic Element in the questions; retrieving, for each Defined Lexical Element contained within the questions, all the applicable Formal Definitions from the Formal Glossary; applying the Formal Definitions to the Defined Lexical Elements in the questions in accordance with an interpretation process having at least one critical algorithm; providing the values to the actor; coding each question and its meaningful value as a new Questions and answers definition; and saving these new definitions in the Formal Glossary, which turns the Formal Glossary into a new Intelligent Glossary.

A computer implemented method of interpreting written text is provided, method comprising the steps of: providing an alphabet, at least one symbol for constructing lexical elements, and at least one syntactic element built on the alphabet, the lexical elements, and at least one symbol on at least one computer; determining, by at least one computer, a sort of value, an arity, a notation, and a type for each syntactic element, to provide well-formed syntactic elements and meaningless syntactic elements; building, by at least one computer, formal definitions from well-formed syntactic elements, and determining a type for each formal definition to provide a list of terminologies, assertions, theorems, questions and answers; building, by at least one computer, at least one formal glossary as ordered sets of formal definitions; providing, on at least one computer, to an output of at least one formal glossary, and a related minimal lexicon; parsing, verifying and normalizing each formal definition, by at least one computer, from a formal glossary, to provide a list of defined lexical elements and undefined lexical elements; accepting at least one input, wherein at least one input includes at least one question containing at least one well formed syntactic element; retrieving for each defined lexical element, at least one formal definition from at least one formal glossary; applying at least one formal definition to defined lexical elements according to at least one interpretation process to provide at least one meaningful value; coding each at least one input and at least one meaningful value as a new questions and answers definition; and saving new questions and answers definitions in a formal glossary in a computer, to provide an intelligent glossary. The computer, or computing device, according to the present invention may be a personal computer, workstation, server, handheld computing device, or any other type of microprocessor-based device. The computing device may include, for example, one or more of processor 810, input device 820, output device 830, storage 840, and communication device 860. Input device 820 may include, for example, a keyboard, mouse, pen-operated touch screen or monitor, voice-recognition device, or any other device that provides input. Each and every step of the present invention may be performed by a computing device or received in a computing device. Output device 830 may include, for example, a monitor, printer, disk drive, speakers, or any other device that provides output. The step of accepting at least one input, may be through an input device 820 and may, for example, be an actor inputting information into a keyboard. The step of providing to an output may be, for example, providing to an actor, by way of example on a monitor, information such as a formal glossary and related lexicon. Storage 840 may include, for example, volatile and nonvolatile data storage, including one or more electrical, magnetic or optical memories such as a RAM, cache, hard drive, CD-ROM drive, tape drive or removable storage disk. Communication device 860 may include, for example, network interface card, modem or any other device capable of transmitting and receiving signals over a network. The components of the computing device may be connected, for example, via a physical bus or wirelessly. Software 850, which may be stored in storage 840 and executed by processor 810, may include, for example, the application programming that embodies the functionality of the present disclosure. Software 850 may include, for example, a combination of servers such as application servers and database servers. There may be a network which may include any type of interconnected communication system, which may implement any communications protocol, which may be secured by any security protocol. The corresponding network links may include, for example, telephone lines, DSL, cable networks, T1 or T3 lines, wireless network connections, or any other arrangement that implements the transmission and reception of network signals.

The computing device may implement any operating system, such as Windows or UNIX. Software 850 may be written in any programming language, such as C, C++, Java or Visual Basic. In various embodiments, application software embodying the functionality of the present disclosure may be deployed on a standalone machine, in a client/server arrangement or through a Web browser as a Web-based application or Web service, for example.

Note that the computing device (811) may be a single computer or a networked group of computers, servers or microprocessors. According to one aspect of the present invention, a non-transitory computer readable medium tangibly embodying a software program or a plurality of software programs may be provided on a single computer or networked group of computers.

The step of constructing Lexical and Syntactic Elements may be performed by the steps of: selecting an Alphabet containing at least Lowercase Letters, Uppercase Letters, and Digits; selecting from the set of Symbols, three Primary Symbols i.e. the symbols: "⊥", "@" and "[]"; calling Primary value, a Primary Symbol used singly; calling Ordinary Symbols, all other symbols from the set of Symbols; including:—Definition Symbols, i.e. the symbols: "|-", "≈", and ";";—Change Symbol, i.e.: "↝" (rightwards wave arrow);—Deactivation Symbol, i.e. " " "(simple quote);—any other symbols, such as Parentheses, Linguistic symbols, Logic symbols, Arithmetic symbols, Quantifiers, and Function symbols; calling Word, a chain of Lowercase Letters, coding Natural Languages words, i.e.: nouns, adjectives, verbs, and adverbs; calling Number, a chain of digits, coding Natural whole numbers; calling Elements the group consisting of Primary values, Words, Numbers, and Arrows; calling Arrow, an Element (the target) separated from either an Element or an Arrow (the source) by a Change Symbol; calling Identifier, a chain of letters or digits beginning by an Uppercase Letter; calling Lexical Elements the group consisting of Words, Identifiers, and Ordinary Symbols; selecting Variable symbols in the group consisting of Uppercase Letters used singly; calling Syntactic Elements the group consisting of Symbols, Words, Numbers, Identifiers, Arrows, and Variables. A Notation—which is a data attribute—may be assigned to each Syntactic Element that is a Symbol, this may be performed by the steps of: assigning a Prefix Notation for a symbol that is attached to the beginning of its arguments; for example: "¬" is a Prefix symbol in "¬ (X=X)"; assigning a Postfix Notation for a symbol that is attached at the end of its arguments; for example: "!" is a Postfix symbol in "2!"; assigning a Infix Notation for a symbol that is inserted between its arguments; for example: "+" is an Infix symbol in "2+2"; assigning a Circumfix Notation for a unary symbol that is placed around (bracketing) its arguments; for example: "[]" is a Circumfix symbol in "[1 2]". The step of assigning a Sort of Value—which is a data attribute—to each Syntactic Element may be performed by steps of: selecting Sorts of Value in the group consisting of Truth-values (True, False, Unknown) and Reality-values, sub-sorted into Numerical, Non-Numerical reality; determining if that Sort of Value—Truth or Reality—is either a Fixed or Changing value; assigning a unique Sort of Value—to each Ordinary Symbol, according the usual Sort of Value of its arguments and results; for example: "+" is a Fixed Numerical Reality valued Symbol; processing Primary symbols as Syntactic Elements with polymorphic sorts, namely: used singly or with Truth-valued Syntactic Elements, they have Truth values (Fixed or Changing); used with Reality-valued Syntactic Elements, they have Reality values (Fixed or Changing). The step of assigning an Arity—which is a whole number—to each Syntactic Elements, may comprise the steps of: assigning an Arity equal to zero to Elements, Variables, and Identifiers; assigning to each Ordinary Symbol, an Arity equal to the number of authorized arguments; for example: "+" is a 2-arity Infix symbol in "2+2"; computing the Arity of Primary Symbols entangled inside or around other Syntactic Elements, in accordance with their position in regards to the Syntactic Elements, namely:—assigning an Arity equal to 1 to a Circumfix Primary symbol "[]"; for example: in the chain "[[]]", the inner "[]" is a 0-arity symbol, and the outer [] is a 1-arity symbol;—assigning an Arity equal to 2 to an infix Primary symbol "⊥"; for example: in (the chain "⊥⊥⊥", the inner "⊥" is a 2-arity symbol, and the 2 outer "⊥" are 0-arity symbols. There may be the steps of assembling a unique Symbol concatenated with only 0-arity Syntactic Elements, respecting the Sort of Value, Arity and Notation of the Symbol; such a well formed syntactic element is called Atomic; for example, X+1 is atomic; a standalone Element is atomic; for example, 1 is atomic; assembling a unique Symbol concatenated with other Well-Formed Syntactic Elements, atomic or non-atomic, respecting the Sort, Arity and Notation of the unique Symbol, and using parentheses to disambiguate the order of evaluation of Syntactic Elements; such a Well-Formed Syntactic Element is called Non-atomic; calling all other forms of syntactic elements "ill-formed", and therefore "meaningless", as their value is not computable by the present computer implemented method; calling "the head", the unique symbol of a Well-Formed Syntactic Element, atomic or non-atomic, and calling "the body", the rest of the Well-Formed Syntactic Element; the head and the body of a standalone Element are the same; calling "the Sort of Value of a Well-Formed Syntactic Element", the Sort of Value of the head of that Well-Formed Syntactic Element; calling "bound", an occurrence of a variable, which is in the body of a quantifier or a function symbol in a Well-Formed Syntactic Element; otherwise, the occurrence of that variable is called "free"; calling "ground", a Well-Formed Syntactic Element which contains no free variables; otherwise it is called "non-ground"; calling "literal", a Well-Formed Syntactic Element which contains only Elements, and Primary Symbols; otherwise it is called "non-literal"; a literal is ground. The critical algorithm utilized in the interpretation process may be the Formula Calculation Algorithm (FCA), the Add Definition Algorithm (ADA); and the Equation Resolution Algorithm (ERA).

Well-Formed Syntactic Elements may be typed as: Instructions, which contain at least one Symbol of Definition, wherein Instructions are sub-typed as: Injunctions, built on two formulas, the indicative part (the right-hand formula) and the body (the left-hand formula) surrounding the infix Symbol of Definition "≈";
    a simple Injunction is coded as "β≈γ";
    a multiple Injunction is coded as "β$_0$≈γ$_0$; β$_1$≈γ$_1$; ... ";
    An Injunction—simple or multiple—is called:
    Atomic, if all its left-hand Formulas are atomic;
    Unknown, if all its right-hand Formulas are @;

Definitions, built on an expression—the pre-condition, and an injunction, simple or multiple, separated by the infix symbol of definition "|-"; a definition is coded as a three-part pattern form, namely:
    "α|-β≈γ", when constituted with a pre-condition α, and a simple Injunction, "β≈γ"; and
    "α|-η", when constituted with a pre-condition α, and a multiple Injunction, η;
    A Definition is called ground, if both its pre-condition and its Injunction, simple or multiple, are ground. Glossaries, which are ordered lists of Definitions, may be separated by the infix Symbol of Definition ";". Formulas, which contain no Symbols of Definition, may be sub-typed as Expressions (which have truth-values), and Terms (which have reality values); wherein expressions may be sub-typed as Indication Expressions (atomic) and Ordinary expressions (non-atomic); equating literal ordinary expressions either as Arrangements (with multiple Primary Symbols) or Primary values (with only one Primary Symbol); wherein Terms may be sub-typed as Indication Terms (atomic) and Ordinary Terms (non-atomic); equating literal ordinary terms either as Packages (packaged forms, single or multiple), Bunches (non-packaged and with multiple Elements) or Unitary Terms ("uniterms" with only one non-packaged Element, i.e.: numbers, words and arrows). Each Formal Definition may have a definition type selected from the group consisting of Terminologies, Assertions, Theorems and Questions and answers, wherein:
    1. a Terminology is a non-ground definition with an atomic injunction, 2. an Assertion or Anti-assertion is a ground definition with an atomic injunction, 3. a Theorem or Anti-theorem is a non-ground definition with a non-atomic injunction, 4. a Question and answer is a definition with an Unknown injunction, which must be computed by the present computer implemented method. These four basic types of definition are further sub-typed in other sub-types of definition in accordance with their syntactical structure. A Defined Lexical Element is the unique lexical element that appears within the atomic indicative part β, of a three-part pattern Terminology definition coded as "α|-β≈γ".

The method may comprise the steps of providing to an Actor at least one Intelligent Glossary; parsing and verifying the Formal Glossaries and their Formal Definitions to infer the type of Syntactic Elements they contain; ordering and storing the Formal Definitions from the Formal Glossaries. There may also be the steps of: producing a Minimal Lexicon build from Defined Lexical Elements that appear in the indicative part β of a definition 'α|-β≈γ' in the Formal Glossary. The method may further comprise the steps of allowing an actor to cluster or select written texts from Lexical Elements contained within Minimal Lexicons and appearing within written texts, and may further comprise of the steps of: respecting field specific distinctions, as each Lexical Element contained within a Minimal Lexicon is the Indication in a Distinction, in accordance with Laws of Form Calculus of Distinctions; modularizing a field of endeavor into domains by using distinctions applicable to one domain, for drawing precise boundaries with all other domains in that field of endeavor; providing a single meaning to all natural language words, symbols and identifiers for the whole system of Minimal Lexicons, considered as sets of lexical elements, from Intelligent Glossaries; operating semantically, i.e. preserving the single meaning of elements of the Minimal Lexicon with the usual set operators (i.e. set union, set intersection, set complement, set difference, set symmetric difference, ... ) in order to construct complex Lexicons, covering specifically the field of endeavour; selecting key-words from written texts, which are the high-frequency words appearing within the written texts in that field of endeavor; semantic researching on the Internet or Intranet by identifying key-words with Lexical Elements contained in Minimal Lexicons generated from Intelligent Glossaries of the domains. There may be the steps of accepting from an actor, human or machine, a question which is a set of formal texts containing at least one Well-Formed Syntactic Element, wherein the value of the Well-Formed Syntactic Element is unknown; parsing and verifying the formal text of the question to infer the type of Syntactic Element it contains, and to produce Formulas contained in the question; and initializing the Rewriting Area with the Formulas contained in the question. The may also be the steps of retrieving for each Formula in the Rewriting Area, all matching Formal Definitions from Formal Glossaries, using algebraic mechanisms of unification and instantiation; eliminating redundant or inconsistent matching definitions to provide an optimized tree of applicable definitions, and its related Current Substitution; building the tree of all applicable definitions from Formal Glossaries, to each sub-formula of the Formulas in the Rewriting Area.

The interpretation process may comprise the steps of: starting by translating each sub-formula of the Formulas in the Rewriting Area, in accordance with the algebraic mechanisms of substitution and replacement, and continues up to a literal Formula appears; stopping by reducing the literal Formula in the Rewriting Area, in accordance with the Laws of Form Calculus of indications for computing its normal form, which is its value; by Laws of Form, this value is unique. The step of translating a Formula may be comprising: applying Formal Definitions from the tree of all applicable definitions, to sub-formulas of the Formula in the Rewriting Area; considering Formal Definitions as conditional rewriting rules, to transform a formula while preserving its value; combining and comparing different results from the tree of all applicable definitions, to produce a unique meaningful value; coding $<\alpha>$ the unique value of Formula $\alpha$, as computed in accordance with the present interpretation process. The step of applying Formal Definitions may be precisely defined by the sentence "Apply a Definition ($\alpha$|-$\beta$≈$\gamma$) to a Formula $\phi$", which is the combination of the Pre-condition and Injunction mechanisms, namely:
  1. If $<\alpha>$ is True then apply Injunction $\beta$≈$\gamma$ to $\phi$, i.e. replacing with $\gamma$ any appearance of $\beta$ in $\phi$;
  2. If $<\alpha>$ is False then do nothing to $\phi$;
  3. If $<\alpha>$ is Undefined then stop current transformation of $\phi$, which transmit Unknownness value.

The symbol $<\alpha>$ may be used to indicate any predetermined criteria.

The method may comprise the steps of inserting LoF Algebraic Initials, Position and Transposition, as Theorem type Definition in active Glossary; initializing an active Glossary with hard-coded definitions of string manipulations. The list of Hard-Coded Functions may be:
  concatenation of a string on the right side into a string; and updating the Current Substitution and the Rewriting Area;
  de-concatenation of a string on the right side into a string, and a character; and updating the Current Substitution and the Rewriting Area;
  concatenation of a string on the left side into a string; and updating the Current Substitution and the Rewriting Area;
  de-concatenation of a string on the left side into a string and a character; and updating the Current Substitution and the Rewriting Area;
  generic equality of two formulas, including syntactic equality of strings, by unifying, valuating—by using FCA, and comparing syntactically their respective values, and updating the Current Substitution and the Rewriting Area;
  deactivation of a Well-Formed Syntactic Element, which turns it into a mere and purely syntactical chain of symbols; and
  quantification of a Formula by a variable, which develops that quantified Formula by listing the variable on the Words Table: "For All" Quantifier is developed as a generalized conjunction; "There exists" Quantifier is developed as a generalized disjunction.

The method may comprise of the step of: providing an answer to actor as the meaningful value of a syntactic element, if syntactic element is not meaningless; coding the meaningful value of a Well-Formed Syntactic Element as a question and answer type definition, on the form:
  '[]|-$\beta$≈$\gamma$', for a question without pre-condition, where $\beta$ is the formula of the question, and $\gamma$ is the meaningful value;
  '[]|-$\alpha$⇒ $\beta$≈[]', for a question with a pre-condition, where $\alpha$ is the pre-condition of the question, $\beta$ is the formula of the question (⇒ is the logical implication);
saving in the formal glossary the result definition, in accordance with the types of definition.

A computer implemented method of determining the meaning of formal language constructs occurring in written texts, the method comprising the steps of: providing an Alphabet and a set of Symbols for constructing Lexical Elements, and Syntactic Elements built on the Alphabet, Lexical Elements, and Symbols; determining a Sort of Value, an Arity, a Notation, and a Type for each the Syntactic Element, to provide Well-Formed Syntactic Elements and meaningless syntactic elements; building Formal Definitions from the typed Well-Formed Syntactic Elements, and determining a type for each definition to provide a list of Terminologies, Assertions, Theorems, Questions and answers; and building Formal Glossaries as ordered sets of Formal Definitions; acquiring from a Knowledge Manager (12) a Formal Glossary content; parsing, verifying and normalizing each Formal Definition contained in the Formal Glossary, to provide a list of Defined Lexical Elements and undefined lexical elements; drawing consequences of each Assertion and Theorem of the Formal Glossary, to compute new derived Assertions and to check compliance with existing Terminologies, in accordance with an interpretation process having at least one critical algorithm; acquiring questions from an actor, wherein each question is a set of formal texts containing at least one Well-Formed Syntactic Element; parsing, verifying and normalizing each Well-Formed Syntactic Element in the question; retrieving, for each Defined Lexical Element contained within the questions, all the applicable Formal Definitions from the Formal Glossary; applying the Formal Definitions to the Defined Lexical Elements in the questions in accordance with an interpretation process having at least one critical algorithm; providing the values to the actor; coding each question and its meaningful value as a new Question and answer definition; processing a Formal Glossary as a set of formal texts, using the self-reference capacity of the present computer implemented method, to certify the Formal Glossary; and saving the certified Formal Glossary and its related Minimal Lexicon, wherein the lexicon is comprised of at least one Well-Defined Lexical Element, as an initial Intelligent Glossary. The step of constructing Lexical and Syntactic Elements, may further comprise the steps of: selecting an Alphabet containing at least Lowercase Letters, Uppercase Letters, and Digits; selecting from the set of Symbols, three Primary Symbols i.e. the symbols: "⊥", "@" and "[]"; calling Primary value, a Primary Symbol used singly; calling Ordinary Symbols, all other symbols from the set of Symbols; including:—Definition Symbols, i.e. the symbols: "|-", "≈", and ";";—Change Symbol, i.e.: "↝" (rightwards wave arrow);—Deactivation Symbol, i.e. " " "(simple quote);—any other symbols, such as Parentheses, Linguistic symbols, Logic symbols, Arithmetic symbols, Quantifiers, and Function symbols; calling Word, a chain of Lowercase Letters, coding Natural Languages nouns, adjectives, verbs, and adverbs; calling Number, a chain of digits, coding Natural whole numbers; calling Elements the group consisting of Primary values, Words, Numbers, and Arrows; calling Arrow, an Element (the target) separated from either an Element or an Arrow (the source) by a Change Symbol; calling Identifier, a chain of letters or digits beginning by an Uppercase Letter; calling Lexical Elements the group consisting of Words, Identifiers, and Ordinary Symbols; selecting Variable symbols in the group consisting of Uppercase Letters used singly; calling Syntactic Elements the group consisting of Symbols, Words, Numbers, Identifiers, Arrows, and Variables.

A Notation—which is a data attribute—may be assigned to each Syntactic Element that is a Symbol, further comprising the steps of:
  assigning a Prefix Notation for a symbol that is attached to the beginning of its arguments; for example: "¬" is a Prefix symbol in "¬ (X=X)";
  assigning a Postfix Notation for a symbol that is attached at the end of its arguments; for example: "!" is a Postfix symbol in "2!";
  assigning a Infix Notation for a symbol that is inserted in the middle of its arguments; for example: "+" is an Infix symbol in "2+2";
  assigning a Circumfix Notation for a unary symbol that is placed around (bracketing) its arguments; for example: "[]" is a Circumfix symbol in "[1 2]"

The method may further comprise the step of assigning a Sort of Value—which is a data attribute—to each Syntactic Element, further comprising the steps of: selecting Sorts of Value in the group consisting of Truth-values (True, False, Unknown) and Reality-values, sub-sorted into Numerical, Non-Numerical reality; determining if that Sort of Value—Truth or Reality—is either a Fixed or Changing value; assigning a unique Sort of Value—to each Ordinary Symbol, according the usual Sort of Value of its arguments and results; for example: "+" is a Fixed Numerical Reality valued Symbol; processing Primary symbols as Syntactic Elements with polymorphic sorts, namely: used singly or with Truth-valued Syntactic Elements, they have Truth values (Fixed or Changing); used with Reality-valued Syntactic Elements, they have Reality values (Fixed or Changing).

The method may comprise the step of assigning an Arity—which is a whole number—to each Syntactic Elements, further comprising the steps of:
  assigning an Arity equal to zero to Elements, Variables, and Identifiers;
  assigning to each Ordinary Symbol, an Arity equal to the number of authorized arguments; for example: "+" is a 2-arity Infix symbol in "2+2"; computing the Arity of Primary Symbols entangled inside or around other Syntactic Elements, in accordance with their position in regards to the Syntactic Elements, namely:
    assigning an Arity equal to 1 to a Circumfix Primary symbol "[]"; for example: in the chain "[[]]", the inner "[]" is a 0-arity symbol, and the outer [] is a 1-arity symbol;
    assigning an Arity equal to 2 to an infix Primary symbol "⊥"; for example: in (the chain "⊥⊥⊥", the inner "⊥" is a 2-arity symbol, and the 2 outer "⊥" are 0-arity symbols.

The method may further comprise the step of: assembling a unique Symbol concatenated with only 0-arity Syntactic Elements, respecting the Sort of Value, Arity and Notation of the Symbol; such a well formed syntactic element is called Atomic; for example, X+1 is atomic; a standalone Element is atomic; for example, 1 is atomic; assembling a unique Symbol concatenated with other Well-Formed Syntactic Elements, atomic or non-atomic, respecting the Sort, Arity and Notation of the unique Symbol; using parentheses to disambiguate the order of evaluation of Syntactic Elements; such a Well-Formed Syntactic Element is called Non-atomic; calling all other forms of syntactic elements "ill-formed", and therefore "meaningless", as their value is not computable by the present computer implemented method; calling "the head", the unique Symbol of a Well-Formed Syntactic Element, atomic or non-atomic, and calling "the body", the rest of the Well-Formed Syntactic Element; the head and the body of a standalone Element are the same; calling "the Sort of Value of a Well-Formed Syntactic Element", the Sort of Value of the head of that Well-Formed Syntactic Element; calling "bound", an occurrence of a variable, which is in the body of a quantifier or a function symbol in a Well-Formed Syntactic Element; otherwise, the occurrence of that variable is called "free"; calling "ground", a Well-Formed Syntactic Element which contains no free variables; otherwise it is called "non-ground"; calling "literal", a Well-Formed Syntactic Element which contains only Elements, and Primary Symbols; otherwise it is called "non-literal"; a literal is ground.

The Well-Formed Syntactic Elements may be typed as: Instructions, which contain at least one Symbol of Definition, wherein Instructions are sub-typed as:
  Injunctions, built on two formulas, the indicative part (the right-hand formula) and the body (the left-hand formula) surrounding the infix Symbol of Definition "≈"; a simple Injunction is coded as "β≈γ"; a multiple Injunction is coded as "$\beta_0 \approx \gamma_0; \beta_1 \approx \gamma_1; \ldots$"; An Injunction—simple or multiple—is called: Atomic, if all its left-hand Formulas are atomic; Unknown, if all its right-hand Formulas are @;
  Definitions, built on an expression—the pre-condition, and an injunction, simple or multiple, separated by the infix symbol of definition "|-"; a definition is coded as a three-part pattern form, namely:
    "α|-β≈γ", when constituted with a pre-condition α, and a simple Injunction, "β≈γ"; and
    "α|-η", when constituted with a pre-condition α, and a multiple Injunction, η;
  A Definition is called ground, if both its pre-condition and its Injunction, simple or multiple, are ground;
  Glossaries, which are ordered lists of Definitions, separated by the infix Symbol of Definition ";";
  Formulas, which contain no Symbols of Definition, may be sub-typed as Expressions (which have truth-values), and Terms (which have reality values); expressions may be sub-typed as Indication Expressions (atomic) and Ordinary expressions (non-atomic); equating literal ordinary expressions either as Arrangements (with multiple Primary Symbols) or Primary values (with only one Primary Symbol); the Terms may be sub-typed as Indication Terms (atomic) and Ordinary Terms (non-atomic); equating literal ordinary terms either as Packages (packaged forms, single or multiple), Bunches (non-packaged and with multiple Elements) or Unitary Terms ("uniterms" with only one non-packaged Element, i.e.: numbers, words and arrows). Each Formal Definition may have a definition type selected from the group consisting of Terminologies, Assertions, Theorems and Questions and answers, wherein:
1. a Terminology is a non-ground definition with an atomic injunction,
2. an Assertion or Anti-assertion is a ground definition with an atomic injunction,
3. a Theorem or Anti-theorem is a non-ground definition with a non-atomic injunction,
4. a Question and answer is a definition with an Unknown injunction, which must be computed by the present computer implemented method.

These 4 basic types of definition are further sub-typed in other sub-types of definition, in accordance with their syntactical structure. A Defined Lexical Element is the unique lexical element that appears within the atomic indicative part $\beta$, of a three-part pattern Terminology definition coded as "$\alpha$|-$\beta$≈$\gamma$".

The method may further comprise the steps of: acquiring and ordering from a Knowledge Manager (12) Formal Definitions having the same field specific semantic as their original Natural Language sentences; respecting the field specific distinctions, as each Defined Lexical Element results from a Laws of Form Calculus of Distinction reasoning by the Knowledge Manager (12); formalizing the Formal Definitions following a three-part pattern expressed as '$\alpha$|-$\beta$≈$\gamma$', where $\beta$ is the indication of the underlying distinction, and defining the Defined Lexical Element. There may also be the steps of: parsing and verifying the Formal Glossaries and their Formal Definitions to infer the type of Syntactic Element they contain; normalizing Primary Expressions, for eliminating non-satisfiable sub-formulas while preserving their value, by applying repeatedly the Laws of Forms Algebraic Initials; providing a list of Defined Lexical Elements contained in the Formal Definitions; producing a Minimal Lexicon built from Defined Lexical Elements that appear in the indicative part $\beta$ of a definition '$\alpha$|-$\beta$≈$\gamma$' in the Formal Glossary. There may also be the steps of: retrieving each Assertion and Theorem definition from the Formal Glossary; drawing consequences of each Assertion and Theorem definition, in accordance with an interpretation process having at least one critical algorithm; verifying consistency of each Assertion and Theorem definition with existing Terminology definitions, in accordance with the Laws of Form; providing new derived Assertion definitions, which are logical consequences of the Assertion and Theorem definition. The method may also have the steps of: accepting an input, for example, from an actor, human or machine, a question which is a set of formal texts containing at least one Well-Formed Syntactic Element, wherein the value of the Well-Formed Syntactic Element is unknown; parsing and verifying the formal text of the question to infer the type of Syntactic Element it contains, and to produce Formulas contained in the question; and initializing the Rewriting Area with the Formulas contained in the question. There may also be the steps of: retrieving for each Formula in the Rewriting Area, all matching Formal Definitions from Formal Glossaries, using algebraic mechanisms of unification and instantiation; eliminating redundant or inconsistent matching definitions to provide an optimized tree of applicable definitions, and its related Current Substitution; building the tree of all applicable definitions, acquired from Formal Glossaries, to each sub-formula of the Formulas in the Rewriting Area. There may also be the step of: providing an output, or answer, to the actor as the meaningful value of a syntactic element, if the syntactic element is not meaningless. There may also be the step of: saving the consistent ordered set of Formal Definitions, as a certified Formal Glossary. There may also be the step of: processing a certified Formal Glossary as a formal text using the self-referential Glossary coding the high level specification of the present computer implemented method; certifying the compliance of the certified Formal Glossary with the present computer implemented method; and providing an initial Intelligent Glossary, and its related Minimal Lexicon, from the certified and consistent Formal Glossary.

The interpretation process: may start by translating each sub-formula of the Formulas in the Rewriting Area, in accordance with the algebraic mechanisms of substitution and replacement, and continues up to a literal Formula appears and stop by reducing the literal Formula in the Rewriting Area, in accordance with the Laws of Form Calculus of indications for computing its normal form, which is its value; by Laws of Form, this value is unique.

The steps of translating a Formula may be: applying Formal Definitions from the tree of all applicable definitions, to sub-formulas of the Formula in the Rewriting Area; considering Formal Definitions as conditional rewriting rules, to transform a formula while preserving its value; combining and comparing different results from the tree of all applicable definitions, to produce a unique meaningful value; coding <$\alpha$> the value of Formula $\alpha$, as computed in accordance with the present interpretation process. Applying Formal Definitions is precisely defined by the sentence "Apply a Definition ($\alpha$|-$\beta$≈$\gamma$) to a Formula $\phi$", which is the combination of the Pre-condition and Injunction mechanisms, namely:
1. If <$\alpha$> is True then apply Injunction $\beta$≈$\gamma$ to $\phi$, i.e. replacing with $\gamma$ any appearance of $\beta$ in $\phi$;
2. If <$\alpha$> is False then do nothing to $\phi$;
3. If <$\alpha$> is Undefined then stop current transformation of $\phi$, which transmit Unknownness value.

A computer implemented method as in claim 22, further comprising the step of: inserting LoF Algebraic Initials, Position and Transposition, as Theorem type Definition in active Glossary; initializing an active Glossary with hard-coded definitions of string manipulations. The list of Hard-Coded Functions (HCF) may be:
1. concatenation of a string on the right side into a string; and updating the Current Substitution and the Rewriting Area;
2. de-concatenation of a string on the right side into a string, and a character; and updating the Current Substitution and the Rewriting Area;
3. concatenation of a string on the left side into a string; and updating the Current Substitution and the Rewriting Area;
4. de-concatenation of a string on the left side into a string and a character; and updating the Current Substitution and the Rewriting Area;
5. generic equality of two formulas, including syntactic equality of strings, by unifying, valuating—by using FCA, and comparing syntactically their respective values, and updating the Current Substitution and the Rewriting Area;
6. deactivation of a Well-Formed Syntactic Element, which turns it into a mere and purely syntactical chain of symbols; and
7. quantification of a Formula by a variable, which develops that quantified Formula by listing the variable on the Words Table: "For All" Quantifier is developed as a generalized conjunction; "There exists" Quantifier is developed as a generalized disjunction.

The critical algorithm is selected from the group consisting of Formula Calculation Algorithm (FCA), Add Definition Algorithm (ADA) and Equation Resolution Algorithm (ERA).

A system for verifying, implementing and using a Semantic System of Intelligent Glossaries, the system comprising: an interpretation module having an initialization module, at least one critical algorithm, wherein the interpretation module provides a value for questions, which are set of formal texts containing at least one Well-Formed Syntactical Element; a Parsing module which processes texts of formal glossaries and formal questions; an Add Definition module for verifying a formal glossary, definition by definition, and for certifying compliance and consistency of the glossary; at least one active glossary for storing current glossaries of the whole system; a current substitution initialized with the empty set and updated after each translation; a Rewriting Area for computing on formulas, from the initial formal text of a question, up to its meaningful value; a Words Table, for storing natural language words and the name of their container glossary; a viewer module for editing glossaries and questions, and for interacting with actors; and a File update module for updating glossaries having at least one definition and associated interpretation from the interpretation module. The initialization module may provide system localization services, and data structures initialization. The parsing module may transform formal texts into lexical trees, containing Well-Formed Syntactic Elements and their properties; and automatically infer the type lexical element type of each Well-Formed Syntactic Element in the lexical trees. The translation module may: provide an interpretation for each lexical tree corresponding to a formal text; provide a graph of dependencies between nodes of the lexical trees during computation to detect cycles of computation; provide numbering of variable symbols to avoid collision between variables of a question and variables of a definition, or variables of deactivated sub-formulas of the same question; provide a cache pooling collection for memorizing previously computed formulas and their unique value, to optimize computation algorithms by retrieving values by rapid hash-coding access mechanisms. The at least one critical algorithm is selected from the group consisting of Hard-Coded Functions (HCF), Formulas Calculation Algorithm (FCA), Add Definition Algorithm (ADA), and Equation Resolution Algorithm (ERA). The system may have an Intelligent Glossary containing the ordered set of definitions for the lexical elements and at least one Minimal Lexicon generated from the Intelligent Glossary. The system may be implemented in the computer languages Microsoft .Net/Visual C#. It should be understood, that each step of the present invention may be accomplished or implemented though a computer, computing device, microprocessor and/or network of such devices. As would be appreciated by those of skill in the art, any reference to a step occurring on at least one computer, may be any computing device or network of computing devices. The computer-implemented method uses LoF Arithmetic for computing value of Forms; Forms are formal sentences resulting from questions containing only Literal symbols and chains of symbols, in accordance with the following conventions:

LoF Arithmetic Literal symbols and chains of symbols are:
1. Primary Symbols:
   The symbol "[ ]"—Cross;
   The symbol "⊥"—Space;
   The symbol "@"—Arrobas;
   Primary Symbols used singly are called Primary values;
2. Numbers (i.e. 0 1 2 ..., 123, 30000, ...) expressed as digits and chains of digits;
3. Words (i.e. "rule", "customer", "service", ...) expressed as chains of lower-case letters;
4. Arrows (i.e. 1↝2, pending↝invoiced, ...) expressed as Arrows of Primary Symbols, Words, Numbers or other Arrows.

Convention of reference:
In LoF Arithmetic, the injunction "Take any form $\alpha$" is a contraction for:
1. Write a form;
2. Mark it with $\alpha$;
3. Let $\alpha$ be its name;
4. Let the name indicate the form.

Convention of change:
1. In any form, a sub-form can be changed for an equivalent form; such an equivalent change is called a step;
2. steps may be taken in either direction.

Hypothesis of simplification:
1. A normal form of a form is the simplest form into which, by taking steps, it can be changed.
2. in accordance with LoF the result of that simplification—its normal form—is unique.

Data Structures, operators, injunction and computation in LoF Arithmetic are formally defined as follows:
Elements, Bunches, Packages, and Arrangements are "The Forms"; they are defined as follows;
1. Elements: Primary values, Words, Numbers, and Arrows are Elements; an Element is a Form;
2. Bunches: Bunches are inductively defined as follows: an Element is a Bunch; If $\alpha$ and $\beta$ are Forms, then the Calling of $\alpha$ and $\beta$, i.e. $\alpha\beta$, is a Bunch; a Bunch is a Form;
3. Packages: Packages are defined as follows: If $\alpha$ is a Form then the packaging of $\alpha$, i.e. $[\alpha]$, is a Package; a Package is a Form;
4. Arrangements: Arrangements are Forms that contain only Primary Symbols.

LoF Operations:
1. Cross Operator:
   Take any form $\alpha$; The Package $[\alpha]$ is the result of Cross Operator on $\alpha$;
2. Space Operator:
   Take any forms $\alpha$ and $\beta$; the Call $\alpha\beta$ is the result of Space Operator on $\alpha$ and $\beta$;

LoF injunctions:
1. LoF injunction are formalized as Rewriting Rules on Forms:
   Take any forms $\alpha$ and $\beta$; "$\alpha \approx \beta$" stands for the Rewriting Rules:
   1. "Replace all occurrence of $\alpha$ with $\beta$ into any forms where the sub-form $\alpha$ appears".

The LoF Arithmetic injunctions are the following:
1. Omission of the symbol "⊥":
   [⊥]≈[];
   ⊥⊥≈⊥;
   []⊥⊥≈[]; ⊥⊥[]≈[];
   @⊥⊥≈@; ⊥⊥@≈@;
2. The 2 axioms of George Spencer Brown:
   Auto-Symmetry of Crossing:
   Take any form $\alpha$: $[[\alpha]]\approx\alpha$;
   Idempotence of Calling:
   Take any form $\alpha$: $\alpha\alpha\approx\alpha$;

3. Extension for Self-referential Element:
  Dominance:
    Take any form α: []α≈[];
  Abandonment of the Law of the excluded middle:
    [@]≈@.
4. Extension for Bunches Rearrangement and Sorting:
  Calling Commutativity:
    Take any forms α and β: α β≈β α; and
  Calling Associativity:
    Take any forms α, β and γ: (α β) γ≈α (β γ);

LoF Arithmetic is the rewriting of LoF Forms onto themselves, by applying repeatedly LoF injunctions to reduce the number of non-distinct sub-forms appearing in the initial form:
  1. The normal form resulting is the value of the form;
  2. Two forms are equal if, and only if, they have the same value.

The computer-implemented method uses LoF Algebra for computing the value of Formulas; Formulas are formal sentences resulting from definitions and questions containing, in addition to Literal Symbols, non-Literal Symbols, Identifiers and variables, with the following conventions.

The main non-Literal Symbols are:
  1. The Symbols of Definition, in accordance with the present computer implemented method, namely: "β-" "≈" ";"
  2. The Linguistic symbols, which are used to formalize semantic relations between Natural Language words (i.e. the "is" symbol ".", the "is a" symbol ":", the subsumption symbol "⊏" . . . );
  3. The Logical symbols (i.e.: quantifiers (∀, ∃), logical connectors, i.e. "¬", "∧", "∨", "⇒", . . . );
  4. The Mathematical symbols (i.e. arithmetical symbols ("+", "−","/"", "x"), equality symbol ("="), function symbol ("→"), function application symbol ("_"), . . . ).

An Identifier is a codification or a label beginning with an Upper-case Letter; for example: "Zip code", "Postal code", "CUSTOMER" Data Base, "Posting" process . . . ; An Identifier is not a word;

Identifiers, non-Literal Symbols and Words are the Lexical Elements;

An Arity, a Sort of Value, and a Notation are assigned to each Syntactic Element:
  1. Arity is a whole number:
    Words, Numbers and Identifiers are 0-Arity Lexical Elements;
    Symbols are either 1-Arity (unary), or 2-Arity (binary).
  2. The authorized Notations for Symbols are:
    Infix notation: the binary symbol is inserted between its (two) arguments;
    Prefix notation: the unary symbol is attached to the beginning of its arguments;
    Suffix notation: the unary symbol is attached at the end of its arguments;
    Circumfix notation: the unary symbol is placed around its unique argument (bracketing).
  3. The Sorts of Value of non-Literal Lexical Elements are given in accordance with their usage, i.e.:
    Logical symbols have Fixed Truth-values;
    Semantic Relation symbols have Fixed Truth-values;
    Arithmetical symbols (i.e. Addition or Multiplication symbols) have Fixed Numerical Reality-values;
    Mathematical function symbols may have Changing values, either Reality (i.e. n→n+1) or Truth (i.e.: A→¬ A) values;
    Identifiers built out of uppercase letters only are predicate: they have Changing Truth-values;
    Identifiers built out of at least one uppercase letter—the first letter—followed by at least another letter: are mathematical functions: they have Changing Reality-values (Numerical or Non Numerical);

A Variable is a symbol which can be substituted with any arbitrary formula:
  1. The Variable symbols are standalone upper-case letters, i.e. A, B, C . . . X, Y, Z;
  2. Variable symbols are 0-Arity Syntactic Elements;

Symbols, Words, Numbers, Identifiers, Arrows, and Variables are called Syntactic Elements;

The formal text of a formula consists of combining Syntactic Elements, either Literal or non-Literal, while respecting their sort, arity and notation.

A Ground Formula is a Formula with no free variables; A Non-Ground Formula is a Formula with at least one free variable:

A Primary Formula is a Non-Ground Formula containing only Primary Symbols and Variables:
  1. A Primary Expression is a Primary Formula, which is an Expression;
  2. A Primary Term is a Primary Formula, which is a Term;

A Clause is a Primary Formula of the form "[[X][Y]]" or "[X[Y]]" or "[[X]Y]";

A Disjunctive Primary Formula is a Primary Formula built by Calling 2 or more Clauses, i.e. of the form "[[A][B]] . . . [[Y][Z]]".

A Formula is either an Expression or a Term, depending on the sort of Value of the Lexical Elements it contains:
  An Expression has a Truth-value; a Term has a Reality-value;

An Indication is a Formula made up of a unique Symbol concatenated with variables or other 0-arity Elements, respecting the sort, arity and notation of that unique Symbol:
  1. An Indication is an atomic Formula for LoF Calculus of Indications.
  2. A Indication Expression is an Indication, which is an Expression;
  3. A Indication Term is an Indication, which is a Term;

An Ordinary Formula is a Formula made up of a unique Symbol concatenated with other Ordinary Formulas, respecting the sort, arity and notation of the unique Symbol:
  1. An Ordinary Formula is a non-atomic Formula, for LoF Calculus of Indications;
  2. A Ordinary Expression is an Ordinary Formula, which is an Expression;
  3. An Ordinary Term is an Ordinary Formula, which is a Term;

A Primary Indicative Formula is a Formula containing only Literals, Primary Symbols, Variables, and Indications:
  1. A Primary Indicative Expression is a Primary Indicative Formula, which is an Expression;
  2. A Primary Indicative Term is a Primary Indicative Formula, which is a Term;

Variables are used for Unification, Assignment, and Substitution, as follows:
  The Unification process consists of binding unified variables with their respective sub-formulas in a Source Formula;
  Elements are constants: they are only unifiable with themselves;

Variables can be unified with other Formulas, for example:
1. Source Formula −2 is unifiable with −V:
   V is assigned the sub-formula 2, which is notated by the binding "V\2";
2. Source Formula −(2+4) is unifiable with −V:
   V is assigned the sub-formula (2+4), which is notated by the binding "V\(2+4)";
3. Source Formula (−2+4) is not unifiable with −V;
4. Source Formula (4+4) is unifiable with (V+V):
   V is assigned the sub-formula 4, which is notated by the binding "V\4";
5. Source Formula (2+4) is not unifiable with (V+V);
6. Both Source Formulas (2+4) and (2+2), are unifiable with (V+W);

The Substitution process consists of changing unified variables by their respective formulas, into any target formula:
1. If the same variable occurs more than once in a formula then we must substitute with the same sub-formula at each occurrence of this variable in the target formula;
2. Different variables can be substituted with the same or different sub-formulas.

Placing Symbols between Syntactic Elements makes some Formulas ambiguous; for example: Formula "1+2*3" might mean: 1 and 2 are added, and then the result is multiplied by 3 giving 9 or 1 is added to the result of multiplying 2 by 3, giving 7; Parentheses symbols can be used to disambiguate formula's unification, by indicating the order of evaluation; for example: 1+(2*3) or (1+2)*3;

Single quotation marks are used to deactivate Non-Ground Formulas; Deactivated Formulas are considered as Ground Formulas, by considering all their Variables as Elements (or "Pseudo-constants");

Double quotation marks are used to designate a formula as a chain of symbols;

An Assignment of Variables is a set of bindings given on these Variables, in accordance with the Unification process.

By extension, LoF Algebra encompasses LoF Arithmetic, as follows:

LoF Forms, either Elements, Bunches, Packages or Arrangements, have equivalent Algebraic Formulas, named Literals:
1. A Literal represents literally a Form of LoF Arithmetic in LoF Algebra;
2. A Literal is a Ground formula: it cannot be substituted;
3. A Literal Expression is a Literal, which is an Expression;
4. A Literal Term is a Literal, which is a Term;

The Sort of Value of Literals in LoF Algebra are:
1. Numbers have Numerical Reality Fixed values.
2. Words have Non-numerical Reality Fixed values;
3. Arrangements have Truth Fixed values;
4. Arrows have Changing-values, either Truth or Reality;
5. Primary symbols are polymorphic, i.e.:
   Primary symbols singly have Truth values (either Fixed or Changing);
   Primary symbols used with Numbers, Words and Arrows have Reality values (either Fixed or Changing).

To Cross is considered as an unary operation whose symbol is a Cross with a circumfix notation;
To Call is considered as a binary operation whose symbol is a Space with an infix notation A Primary Expression is said to be satisfiable if there is some assignment of Variables that will turn it into a Literal Expression, evaluated to [] (Cross) by LoF Arithmetic; otherwise, it is said to be unsatisfiable:
1. A Clause Expression of the form "[[X]X]" or "[X[X]]", for some variable X, is not satisfiable.
2. A Disjunctive Expression is satisfiable if, and only if, one of the Clauses it contains is satisfiable; this can be checked in polynomial time.

In the computer-implemented method, processing a formula consists of Algebraic Mechanisms of Substitution, Replacement, Pre-condition and Normalization, as follows:
1. Replacement:
   If $(\alpha \approx \beta)$, and if $\delta$ is a formula constructed by replacing by $\beta$ any appearance of $\alpha$ in $\gamma$, then $(\gamma \approx \delta)$;
2. Substitution:
   If $(\alpha \approx \beta)$, and if every instance of a given independent variable $\nu$ in $(\alpha \approx \beta)$ is substituted with a formula $\omega$, without being necessary for $\nu$ and $\omega$ to be equivalent or for $\omega$ to be constant or variable, and if as a result of this procedure $\alpha$ becomes $\gamma$ and $\beta$ becomes $\delta$, then $(\gamma \approx \delta)$;
3. Pre-condition:
   A preliminary condition—a pre-condition—is a constraint that an injunction must satisfy in order to be acceptable in rewriting:
   i. A pre-condition delimits the acceptability of transformation from source to target by an injunction;
   ii. Pre-conditions are Expressions (i.e. Truth-valued Formulas);
   iii. "$\alpha | \text{-}\eta$" stands for the execution of injunction $\eta$, constrained by the satisfaction of formula $\alpha$.
4. Normalization:
   Normalizing a Primary Expression is turning it into a Disjunctive Expression, while eliminating all non-satisfiable Clauses it contains;
   i. Normalization a Primary Expression preserves the semantic of that Primary Expression.
   Normalizing a Primary Expression consists of repeatedly applying the LoF Algebraic Initials:
   i. Position: $[[X]X] \approx \perp$;
   ii. Transposition: $[[XY] \; [XZ]] \approx X[[Y][Z]]$; $[[YX] \; [ZX]] \approx [[Y][Z]]X$;

In the computer-implemented method, the following instructional sentences are defined in accordance with the Algebraic Mechanisms:

"Apply Injunction $\beta \approx \gamma$ to Formula $\phi$" means rewriting formula $\phi$, through the Algebraic Mechanisms of Unification and Assignment, Substitution and Replacement.

"Apply Definition $\alpha | \text{-} \beta \approx \gamma$ in Glossary $\kappa$ to Formula $\phi$" is defined by the combination of Applying Injunction and Pre-condition, namely:
If $<\alpha>=[]$ then FCA (Apply Injunction $\beta \approx \gamma$ to formula $\phi$)
If $<\alpha>=\perp$ then do nothing to $\phi$
If $<\alpha>=@$ then stop current transformation of $\phi$, and return (@), which transmit unknowingness;

"Apply Glossary $\kappa$ to Formula $\phi$" is recursively defined by:
For all applicable definitions $\alpha | \text{-} \beta \approx \gamma$ in the glossary $\kappa$,
Apply Definition $\alpha | \text{-} \beta \approx \gamma$ to Formula $\phi$;
The result is the value of the formula, which is notated $<\phi>$;

"Apply Glossary $\kappa$ to Formula $\phi$ with Mode $\mu$" is the core function of Formula Calculation Algorithm (FCA).

"Draw consequences of Assertion and Theorem ([]|-$\beta \approx \gamma$) using glossary $\kappa$", is defined by: $\gamma$ is either [] (Cross) for Assertion or Theorem, or $\perp$ (Space) for Negative Assertion or Antitheorem; Apply Glossary $\kappa$ to Formula β giving <β>, which is a Primary Indicative Formula in which Unknown Indications represent primary values;

Change <β> into a Primary Formula by replacing all Unknown Indications, by primary Variables;

Compute Set of solutions of equation: <β>≈γ; For all coherent set of primary solutions:

{$σ_0, σ_1, σ_2, \ldots$ ), whose primary value are respectively:

{$v_0, v_1, v_2, \ldots$};

insert into glossary κ the set of definitions:

{[]|-$σ_0$≈$v_0$, []|-$σ_1$≈$v_1$, ...}

"Draw consequences of Assertion and Theorem ([]|-β≈γ) using Glossary κ", is the core function of Equation Resolution Algorithm (ERA).

"Normalize Terminology or Theorem α|-β≈γ using Glossary γ" is defined by:

Inserting LoF Algebraic Initials, Position and Transposition, as Theorems in Glossary κ;

If Definition α|-β≈γ is a Terminology, then:

Apply Glossary κ' to Formula α for Normalizing; Expression α is changed to Primary Expression α';

Change temporarily all free variables of Formulas α' and γ into pseudo constants;

Draw consequences of Assertion or Theorem ([]|-α'≈[]) using Glossary κ); Change temporarily Glossary κ to κ';

Apply Glossary κ' to Formula γ for Normalizing; Formula γ is changed to Primary Formula γ';

Insert into glossary κ the definition α'|-β≈γ';

If Definition α|-β≈γ is a Theorem, then:

γ is either [] (Cross) for a Theorem, or ⊥ (Space) for an Antitheorem;

Apply Glossary κ to Formula β for Normalizing; Formula β is changed to β';

Insert into glossary κ the definition α|-β'≈γ;

If Definition α|-β≈γ is a Question without Pre-condition, then:

Apply Glossary κ to Formula β for Normalizing; Formula β is changed to β';

Insert into glossary κ the definition α|-β'≈γ;

If Definition α|-β≈γ is a Question with Pre-condition, then:

Change temporarily all free variables of Expression α into pseudo constants; Expression α is changed to Primary Expression α';

Draw consequences of Assertion or Theorem ([]|-α'≈[]) using Glossary κ); Change temporarily Glossary κ to κ';

Apply Glossary κ' to Formula β for Normalizing; Formula β is changed to Primary Formula β';

Insert into glossary κ the definition α'|-β'≈γ;

"Normalize Definition α|-β≈γ using Glossary κ" is the core function of Add Definition Algorithm (ADA).

The computer-implemented method uses injunctions as conditional instructions to transform a formula for eliminating the number of non-Literal symbols, without changing its value; by the Algebraic Mechanisms, the variables are assigned in the Current Substitution with the corresponding syntactic elements in the formula; the result is a Form which can be processed by the LoF Arithmetic to compute its unique value. LoF Algebra brings a mechanism for normalizing any Formulas into Primary Formulas for comparing semantically such Primary Formulas, and therefore any Formulas.

The interpretation process starts by translating "on the spot" the question's ground formal text, by applying a definition for each lexical element contained in the question, in accordance with the Algebraic Calculation. At the lowest level, only words, numbers and primary symbols appear: it is a literal formula. The interpretation process stops by sorting, rearranging and reducing the literal formula to its value, in accordance with the LoF Arithmetic.

FIG. 1 depicts the synopsis of the computer implemented method used to create, verify, interpret, use and update a Semantic System of Intelligent Glossaries (SSIG) 5.

Knowledge Manager (12) codes formal definition sentences having the same semantics as original natural language definition sentences. A formal glossary (14) contains the ordered set of definitions covering the key words usable to express essential knowledge (10) necessary and sufficient for the activity in a given field of endeavor. Each definition in a formal glossary (14) may be selected from the group consisting of terminology, assertions, theorems and questions and answers. A formal glossary (14) may also refer to other formal glossaries.

A formal glossary is consistent with LoF, if it respects all field specific distinctions: each lexical element results in a Distinction-Based reasoning by the Knowledge Manager (12); field specific distinctions are formalized as indications and formally defined in the formal glossary (14). Formal specifications of the present computer implemented method can be written as a formal glossary (12), which may be named the Self-Referential Glossary; the compliance of any formal glossary with the present computer implemented method is checked by processing it as the ground formal text of a question, through quotation marks, by using the Self-Referential Glossary within a SSIG (16). A formal glossary, which is certified to be consistent within such a SSIG, becomes an initial Intelligent Glossary in that SSIG 5. A Minimal Lexicon (18) is a lexicon automatically generated from an Intelligent Glossary (20), which leads to a consistent lexicon of semantically independent lexical elements.

Questions are ground formal sentences having the same semantics as original natural language questions sentences; Formal questions (22) with free variables are turned into ground sentences by pre-conditioning all the variables they contain. The Interpretation System transforms questions into their responses; both knowledge actors and automated knowledge information system (24) can query formal questions (22) to the Interpretation System. The Intelligent Glossary (20) evolves through use, by saving a question (22) and its answer (23) as a new question and answer definition.

Figure 2:
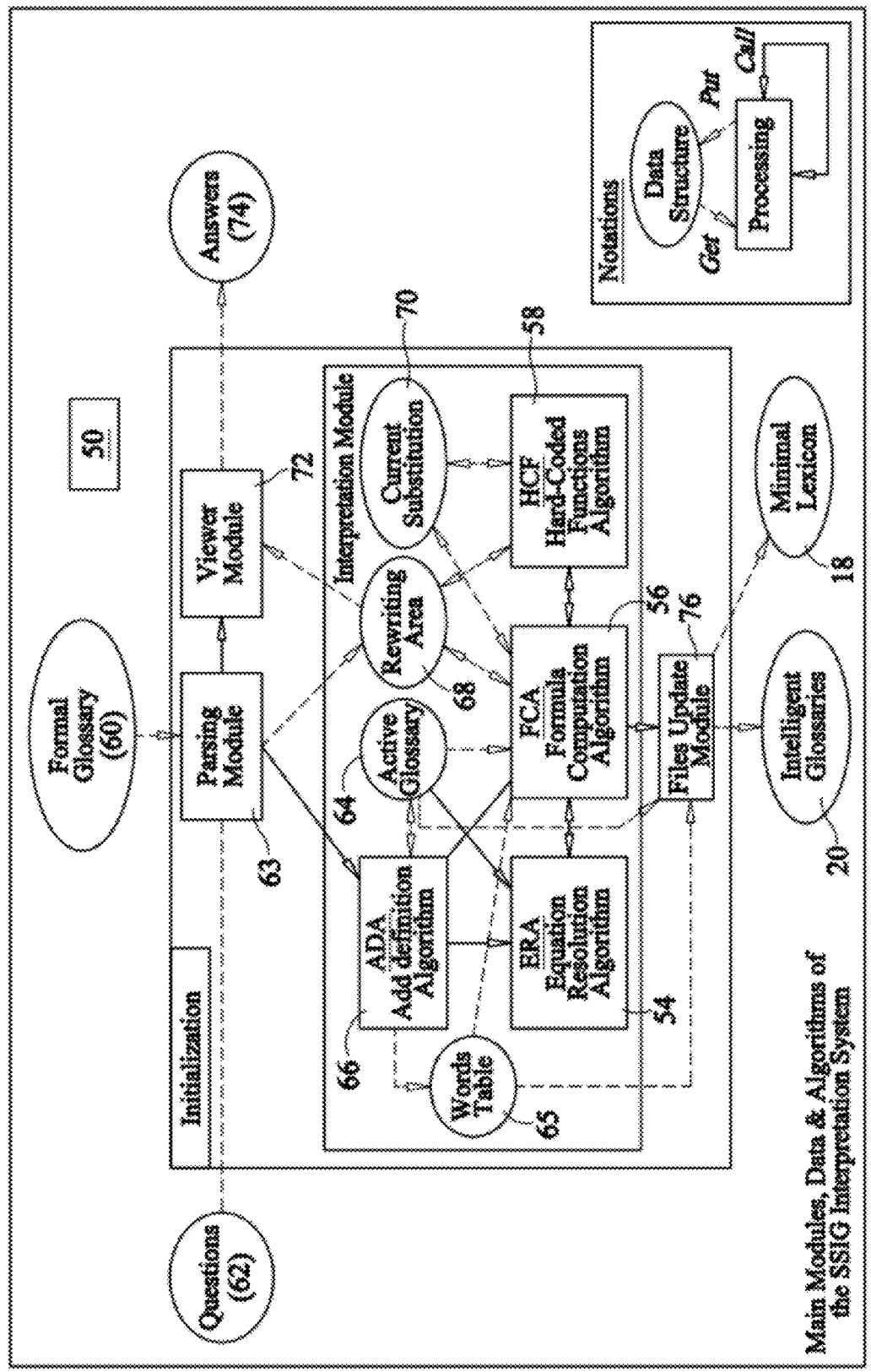
FIG. 2 depicts the Internal Structure of the SSIG Interpretation System and an Overview of mains modules according to the present invention.

FIG. 2 depicts the internal of an Interpretation System (50) for implementing a SSIG 5, including an Interpretation module (52), which uses at least one critical algorithm (e.g. 54, 56, 58). The Current Substitution is a set of bindings (variable, formula) containing assignments of variables; the Current Substitution is initialized with the empty set and updated after each interpretation. The texts of formal glossaries (60) and formal questions (62) are parsed using the parsing module (63), structured by types of syntactic elements and stored into lexical trees by the Parsing Module (63); If no parsing errors are found, then the glossary (64) is checked for semantically duplicate definitions and for consistency, by applying the self-referential glossary imbedded within the SSIG, by the Check and Certification module; natural language words, together with the name of their container glossary, are stored into the Words Table (65); if all glossaries of the SSIG are correct, the corresponding Active Glossary (64) is initialized by the module; It is envisioned that a number of different algorithms may be used. By way of example, though, the algorithm may be the Add Definition Algorithm (ADA) (66), the Formula Calculation Algorithm (FCA) (56) or the Equation Resolution Algorithm (ERA) (54). The algorithms may be updated by the files update module (76), which is in communication with the intelligent glossaries (20) and lexicons (18). The Interpretation module (52) provides an interpretation for a set of formal texts containing at least one lexical element. The text from the question may be rewritten in the rewriting area (68) or substituted in the current substitution (70), delivered to the viewer module (72) and provided as an answer (74)

FIG. 3 depicts the data model and the process model of the computer-implemented method of determining the meaning of formal written language constructs in accordance with the present invention.

FIG. 4 depicts a large Knowledge Management System for verifying, implementing, sharing and using a common Semantic System of Intelligent Glossaries and their related Minimal Lexicons, organizing a decentralized network of Internet documents and highly parallel computer applications using well-defined interfaces, i.e. in XML language; this provides the capability to export data definitions for describing formal interfaces; and to query online properties of lexical elements, inferable from their definition and theorems.

Figure 5D:
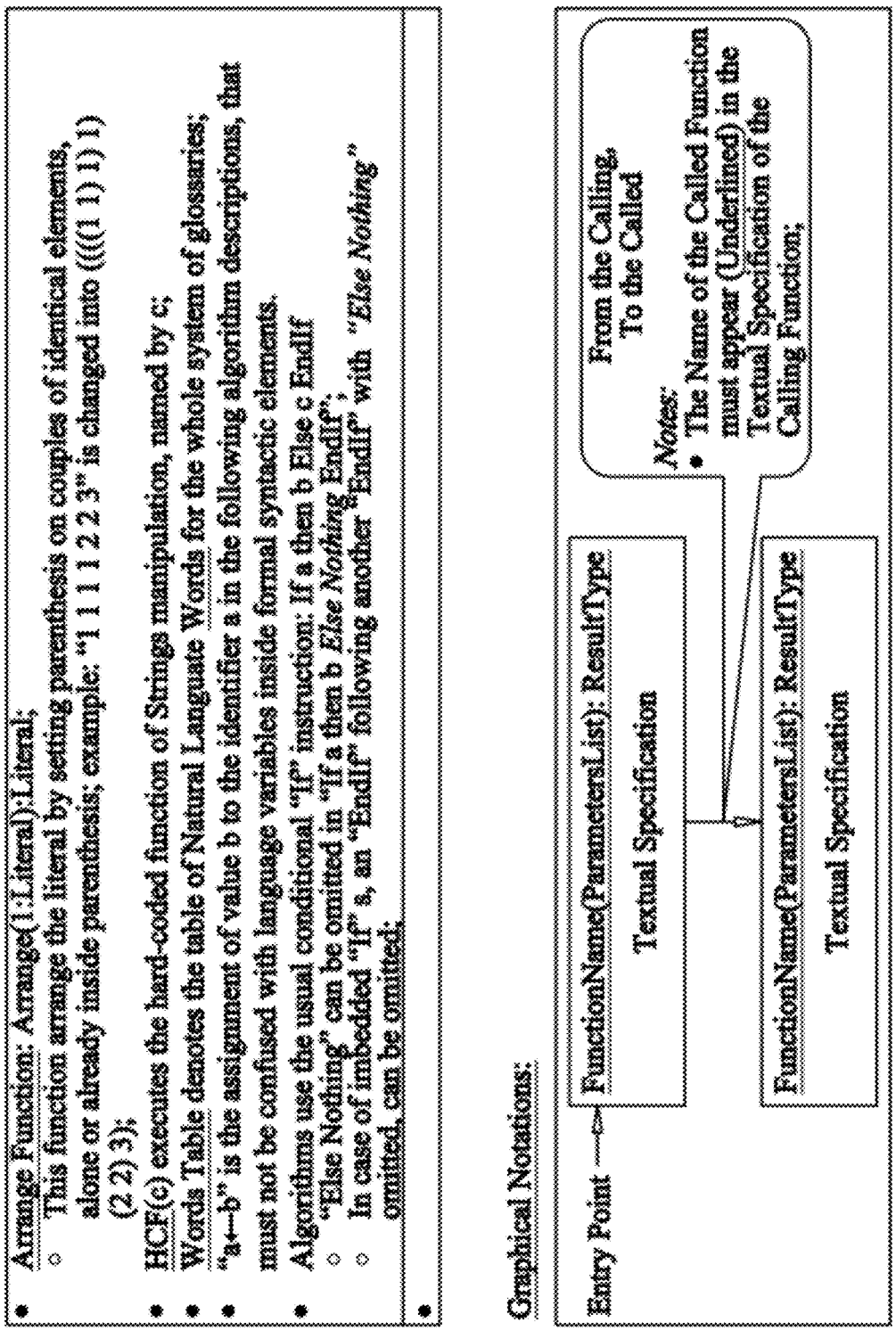
Figure 6A:
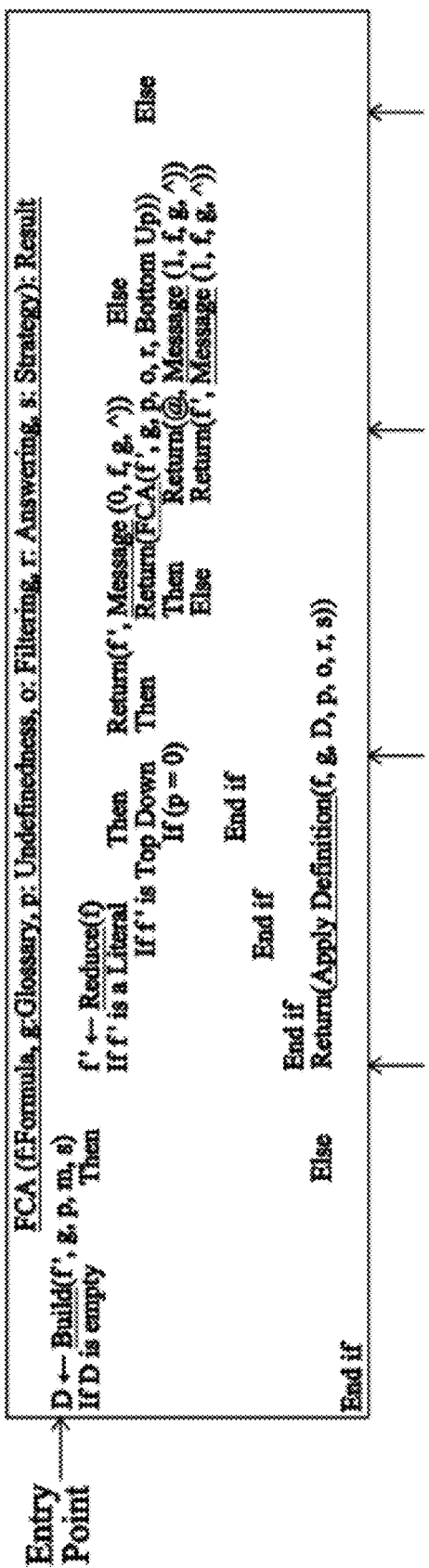
FIGS. 6A, 6B and 6C depict the Formula Calculation Algorithm (FCA)
Figure 6B:
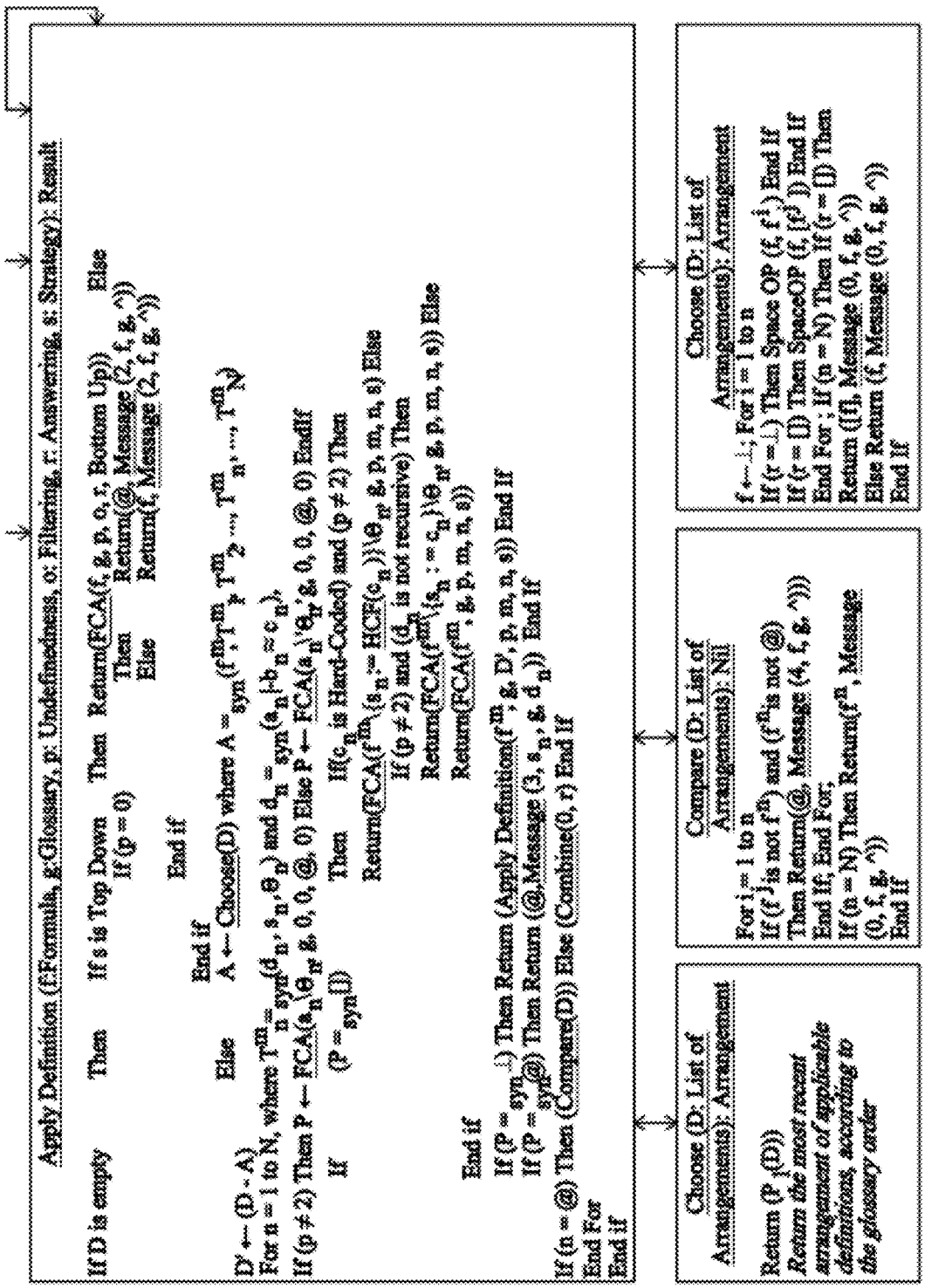
Figure 6C:
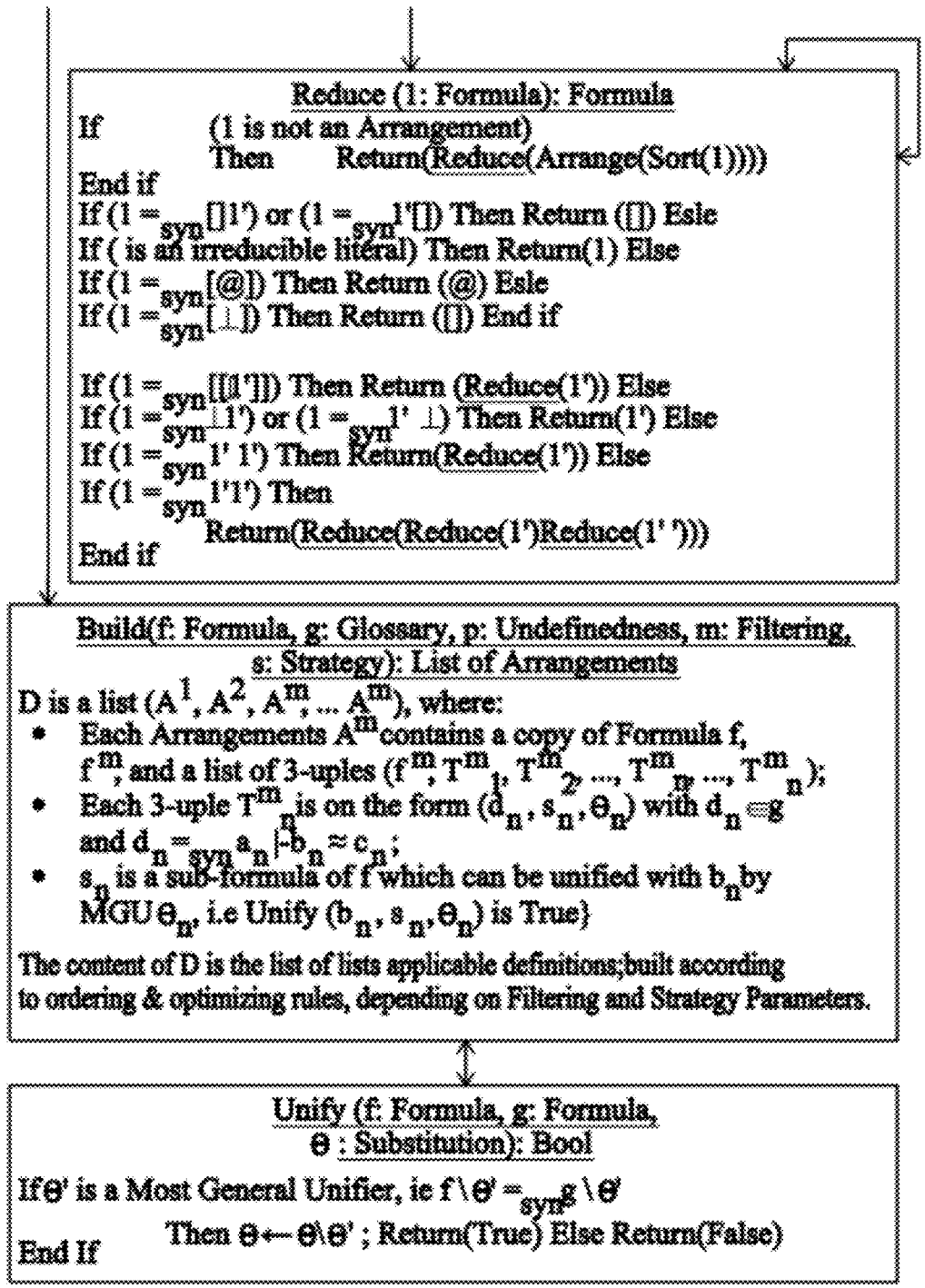
Figure 7B:
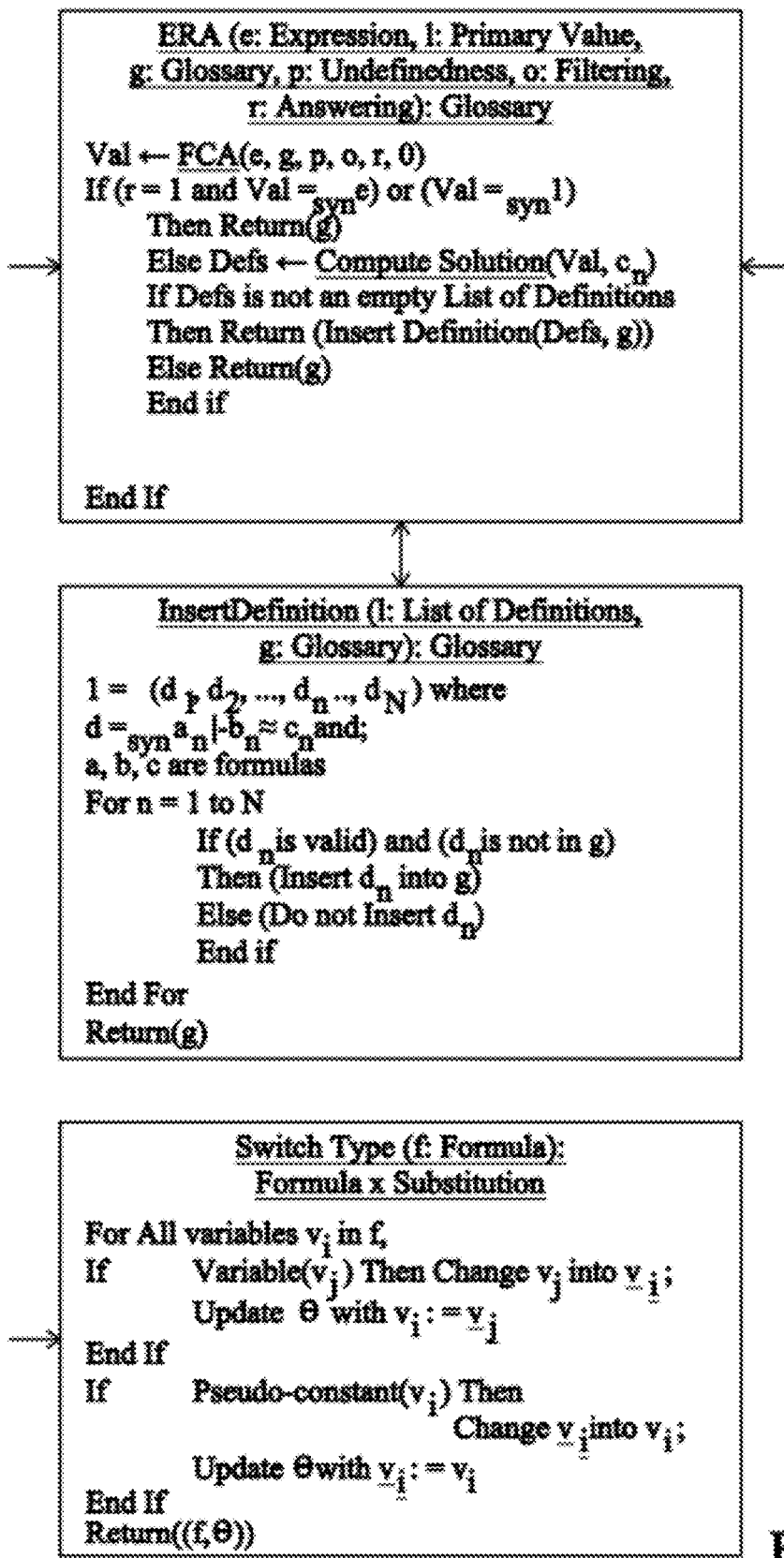
Figure 7C:
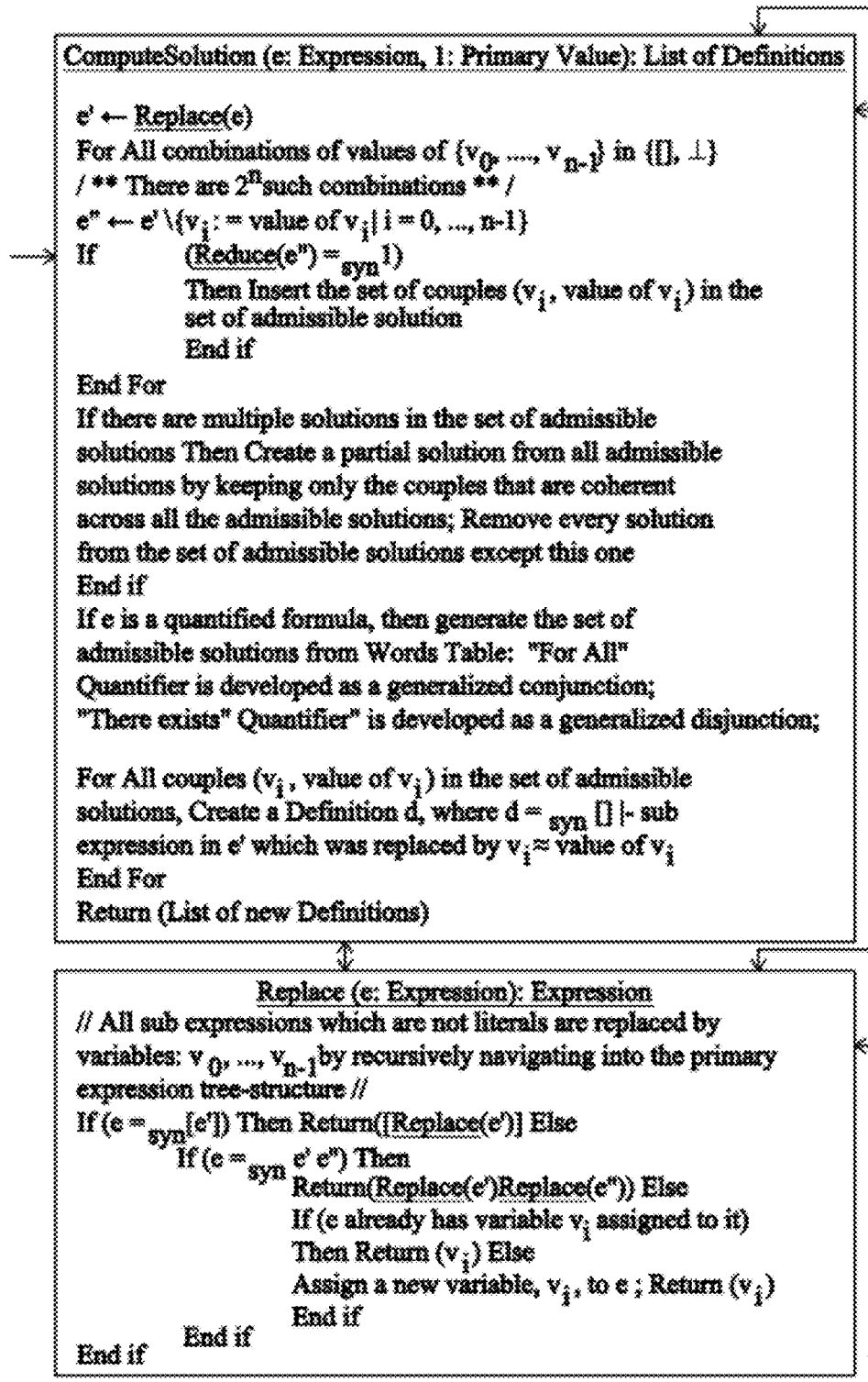
Figure 8:
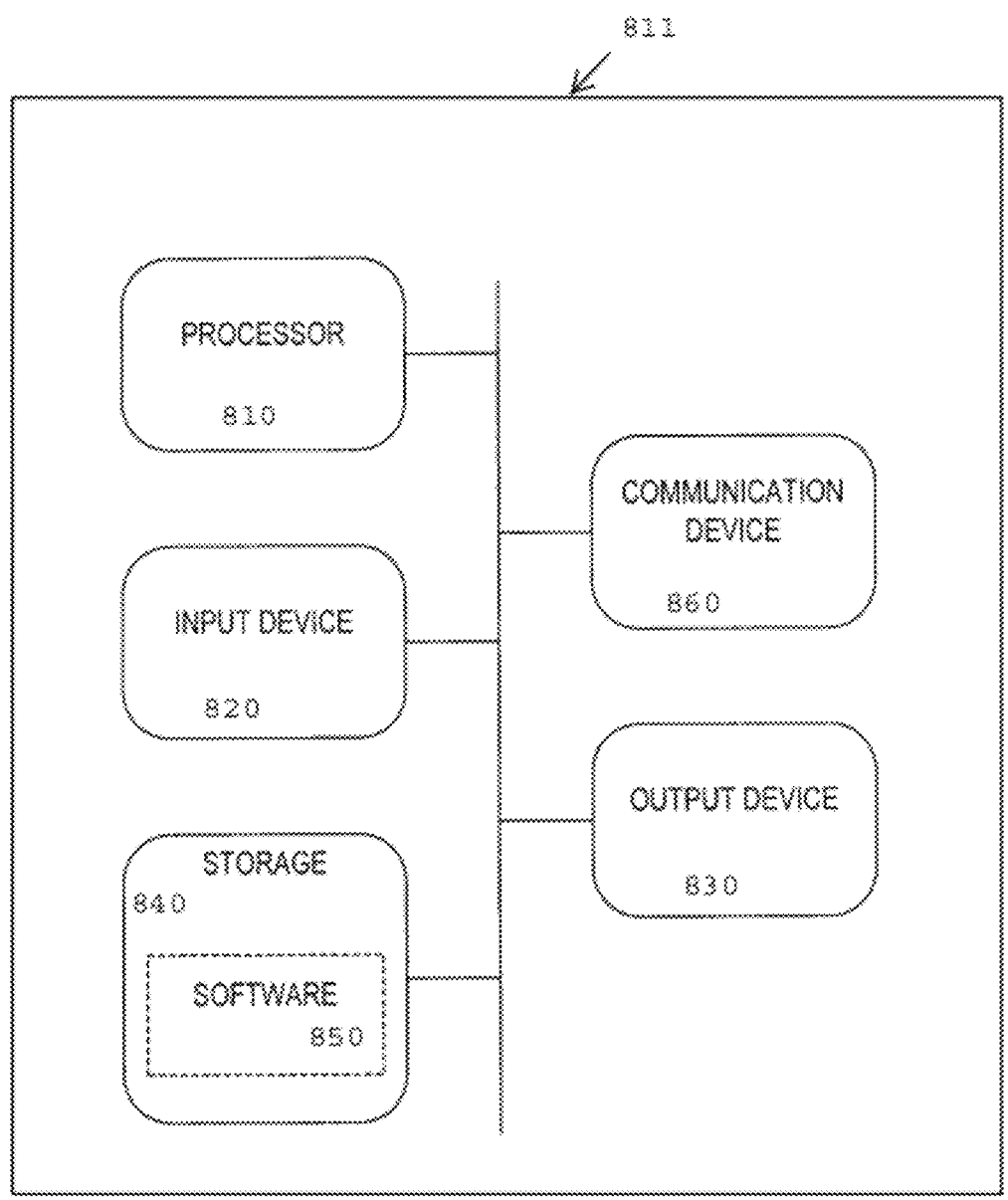
FIG. 8 depicts a block diagram of an example of a basic computing device according to the present invention.

All natural language words, symbols and identifiers acquire the same meaning for the whole system (single meaning); this provides the capability to operate semantically, i.e. preserving the single meaning of words, on such lexicons—considered as sets of lexical elements—with the usual set operators (union, intersection, complement, set difference, symmetric difference) in order to construct complex lexicons, as combinations of lexicons (minimal or complex); such a complex lexicon is a thesaurus, covering specifically a business or a field of endeavour, for searching, selecting and clustering with regard to a group of keywords, belonging together to a complex lexicon; this is called an Intelligent Retrieval. An Intelligent Retrieval on Web documents, written by authors who respect the single meaning defined in the glossaries of the SSIG, enables computers to compute precisely the probability that the document in question is about—or not—a specific business or field of endeavour; for example:

If 80% of terms contained in the lexicon of logics, and 90% of terms contained in the lexicon of arithmetic, occur in a text written by an author who respects the single meaning of words and symbols defined in Intelligent Glossaries then, There is almost 100% probability that this text is about arithmetic and logics;

The main differences with statistical approaches, based on the usage and frequency of words occurring in free texts, are:
1. The keywords—or their formal synonyms—are the high-frequency words appearing within written texts in that field of endeavor;
2. These keywords are well defined lexical elements, and purposely occur in the texts with their single meaning;
3. The lexicons—considered as sets of keywords—are automatically generated from the certified glossaries containing the single meaning definition of keywords;

An Intelligent Retrieval can be launched in parallel distributed processing, on all the formal glossaries of an SSIG; and on a corpus of documents on the Internet. Computer aided translations into another natural language can also be automated by using a SSIG. Lexical Element can be made language independent, by coding them as chains of symbols:

This allows to automate translation of definitions to build a multilingual SSIG;

The Single meaning of words allows a one-to-one translation in multilingual lexicons;

Usage of language dependent synonyms permits richer translations;

FIG. 5 depicts the textual and graphical notations used in the description of the main algorithms in FIGS. 6 and 7.

The basic manipulations, not definable in the computer implemented method, consist of Hard-Coded Functions (HCF) and equations for the manipulation of strings of symbols, such as:

concatenation of a string on the right side into a string; and updating the Current Substitution and the Rewriting Area;

de-concatenation of a string on the right side into a string, and a character; and updating the Current Substitution and the Rewriting Area;

concatenation of a string on the left side into a string; and updating the Current Substitution and the Rewriting Area;

de-concatenation of a string on the left side into a string and a character; and updating the Current Substitution and the Rewriting Area;

generic equality of two formulas, including syntactic equality of strings, by unifying, valuating—by using FCA, and comparing syntactically their respective values, and updating the Current Substitution and the Rewriting Area; and deactivation of a Well-Formed Syntactic Element, which turns it into a mere and purely syntactical chain of symbols.

Quantification of a Formula by a variable, which develops that quantified Formula by listing the variable on the Words Table:
1. A "For All" Quantifier (universal quantifier, typically $\forall$), is developed as a generalized conjunction on all words in the Words Table;
2. A "There exists" Quantifier" (existential quantifier, typically $\exists$), is developed as a generalized disjunction on all words in the Words Table;

FIG. 6 depicts one embodiment of an implementation utilizing The Formulas Calculation Algorithm (FCA). FCA carries out a backtracking inference. Its purpose is to rewrite a formula by replacing sub-formulas in accordance with all their applicable definitions, up to a literal formula is obtained: each time that a lexical element appears, it is translated by the formula of its definition, which reduces the number of non-primary symbols in the formula through the calculation process; the meaning of a formula, in accordance with a terminology definition, is the simpler formula obtained by applying that definition to the initial formula; the sequence of two definitions of the same glossary is the composition of their respective meaning; the FCA operates on the entire glossary, which enables it to evaluate language constructs built on previously defined lexical elements.

FCA is used for applying glossaries to a formula, with different modes (either all undefined indications are changed to @ or all undefined indications remains "as is"); there are two possible cases to which this is applied:

Case 1. For a formula that is an expression, corresponding to a declarative sentence (a statement);

Case 2. For a formula that is a term, corresponding to a naming sentence (for naming an object or a state).

In Case 1, the response of a glossary to a expression is the primary value obtained by applying the tree of all applicable definitions from glossaries of SSIG, to the sub-expressions of the expression; depending on the mode, FCA keeps the unresolved indications as is, instead of valuating them by @; this leads to a primary expression, containing only indications and primary symbols; otherwise the process stops when nothing but primary symbols remain: this is an arrangement. After being reduced by LoF, this arrangement becomes a primary value which is interpreted semantically as follows:
a. "[ ]" means that the expression is true;
b. "" (or "⊥") means that the expression is false;
c. "@" means that the expression is undefined, as there remains at least one unsolved indication.

The proof of the value of an expression in accordance with the glossary applied is the arrangement calculated by applying the glossary to this expression; by the value obtained through its reduction, the arrangement proves the value of the expression.

In Case 2, the meaning of a term in accordance with a glossary is the bunch obtained by applying the sequence of definitions from glossaries of SSIG, to the sub-terms of the term. The algorithm stops when nothing but a collection of words, numbers, and primary symbols remain, which can be semantically interpreted by themselves.

For reuniting the 2 Cases, 1 and 2, the Knowledge Manager (12) may write an equation in the form of @=Y to express a term being defined Y, as an expression; when processing that expression, the hard-coded generic equality recognizes the Unknown Element, @ and interprets it "on the spot" as referring the current sub-term in the question where it appears; that current sub-term is then replaced by the value of Y; this can be reused for a complex term, which is thereafter simplified as a result.

FCA can be used for normalizing the formulas of any definition; in that case: undefined, recursive, hard-coded, and quantified indications are not changed; terminologies in which the indicative part contains at least one constant are not applied; and preconditions are deactivated by the quote function before evaluation.

FIG. 6 depicts another embodiment of an implementation utilizing the Add Definition Algorithm (ADA) and the Equation Resolution Algorithm (ERA). Upon loading the glossary, each definition is checked, normalized and inserted by applying ADA. The comprehension of an assertion is the set of logical consequences (called the derived assertions) that can be drawn from its insertion into the glossary. ERA implements a "forward tracking" inference for simulating that comprehension mechanism: each assertion is interpreted as an equation, where the left-hand term of that equation is a primary expression obtained by applying FCA to the indicative part of the assertion without changing unknown assertions, and the right-hand term of that equation is the primary value of the assertion. That equation is solved through enumeration and a derived assertion is inserted for each indication contained in the primary expression, and its primary value solution. ERA stops when it obtains an expression defined by @. ERA intervenes for respecting theorems, by applying FCA to the indicative part of the theorem, which is a non-ground formula; this leads to creating new derived assertions, by substituting variables with coherent values from compatible assertions contained in the glossary. ERA intervenes also when encountering questions with variables and a pre-condition: it solves the equation by equating the pre-condition to []; ERA keeps the tree of coherent solutions of the pre-condition equation; for each branch of the tree of solutions, ERA inserts a derived assertion for evaluating the corresponding variables temporarily in order to compute the question itself. If the expression contains a quantifier on a word, ERA develops it on the Words Table, which is the set of all applicable Natural Language Words, for computing direct solutions.

In-depth analysis on experts reasoning reveals that experts don't follow rules: experts make Distinctions and reason logically from them. The starting point of our computer implemented method and tool is to conduct up-front domain-specific lexical semantic analysis from clear-cut "distinctions". But what does "distinction making" mean precisely? We reuse the idea of distinction that was theorized and formalized by George Spencer Brown in its mathematic theory "Laws of Form (LoF)". From LoF, we develop innovative distinction-based methods and tools for mutual understanding, knowledge modeling and knowledge transferring in order to support online populations of experts sharing formal definitions into intelligent glossaries that can be formally proven and certified. This can be achieved by changing usage of a limited number of words that are of well-defined in a domain, up to be able to simulate their unique meaning by a machine; we call it "Engineering of Meaning" or Meaning Engineering (ME).

Knowledge is in the meanings of specialized languages used by experts and experienced professionals. There is no means to transfer mechanically knowledge between human beings: it must be recreated by the new comers with a high risk of misunderstanding. Experts use their language to solve problems, but they frequently take shortcuts and other liberties with language:
Experts use expressions that are not formally correct to simplify the exposition, which may not introduce errors or cause confusion for another expert, but are usually barriers for newcomers
Very often even the experts are not aware of their differences in interpretation!

Meaning Engineering will be critical in the forthcoming Knowledge Economy that relies on experts, which are people whose tacit knowledge and expertise is crucial to their company:
Expertise is built on experience in a business domain and is hard to copy by other companies;
Meaning Engineering focuses on prescribing the meaning of basic concepts in that business domain.

Meaning Engineering consists of:
1. Stating definitions, based on clear-cut distinctions from a limited number of symbols and specialized words;
2. Assigning formal properties to symbols and specialized words expressing these definitions;
3. Inserting these symbols and keywords into language writings;
4. Strengthening the artificial meaning of symbols and keywords, by simulating expert reasoning as Distinction Arrangements.

Meaning Engineering is both a method and a tool whereby formal glossaries can be leveraged to precisely define a knowledge domain and thereby render it accessible to non-experts.

Meaning Engineering results in designing synthetic meanings, from natural meanings:
Specialized words and symbols are formally defined in formal glossaries, as precisely as numbers or other mathematical objects: this shortens discourse and makes speeches more accurate;
We can separate what is essential knowledge, which must explicited, from what can be inferred by any human beings and must not be explicited.

Meaning Engineering facilitates:
Knowledge capitalizing and transferring to new-comers;
Intelligent Research on the Internet from engineering common meanings in a community of interest;
Translatability into different languages;
Meaning Engineering produces sets of formal glossaries, constituting a Semantic System of Intelligent Glossaries (SSIG) that is computable by a machine.

In short: with Meaning Engineering, words-meaning become as precise as numbers value.

George Spencer Brown developed a Theory of Distinction in its mathematic in its masterpiece Laws of Form (LoF); here are some extracts from LoF:

"we cannot make an indication without drawing a distinction"

"A distinction is drawn by arranging a boundary with separate sides so that a point on one side cannot reach the other side without crossing the boundary. Once a distinction is drawn, the spaces, states, or contents on each side of the boundary, being distinct, can be indicated. For example, a plane space a circle draws a distinction."

LoF bring a formal planar system for computing values of Indications resulting from distinction: the LoF Calculus of Indications.

LoF is best presented at Wikipedia (http://en.wikipedia.org/wiki/Laws_of_Form).

In the present computational reasoning and methods, we consider Distinction-making in the context of cognitive activity made by a human person, the Distinction Maker, who seek to understand or to be understood:

A Distinction is an insight that both separates and connects two ideas that are mutually incompatible in a given domain.

A Distinction is a knowledge unit that contributes to clarify the domain of its frame:

Distinction-making allows sharing essential knowledge, i.e. required knowledge when confusion is not permitted;

A knowledge domain is identified by its lexicon.

We use LoF Distinction to deal with lexical semantic by separating a word-meaning from its background made of other words-meaning.

Figure 9:
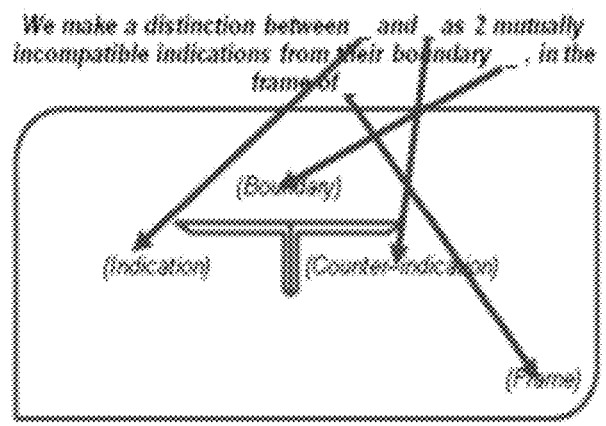
FIG. 9 depicts a Distinction Model.

In the present computational reasoning and methods, a Distinction is represented as a Boundary between an Indication and a Counter-Indication, representing the 2 mutually incompatible ideas, inside a Frame, which represents the (knowledge) domain. Distinction-Making can be represented by Distinction Models, as shown in FIG. 9., in which we make a distinction between an indication and a counter-indication as 2 mutually incompatible indications from their boundary in the frame.

A Distinction Model describes explicitly:
1. the Frame indicates the Knowledge domain or "What we are talking about":
   it can be named or defined by the theory encompassing the Distinction as a whole;
2. the drawn Boundary indicates the distinction.
3. the 2 drawn sides indicates the 2 indications:
   The inside indicates the Indication (atomic);
   The outside indicates the Counter-indication.

We share Distinction-Making from proven Distinction Patterns and Distinction-Based reasoning:

A Distinction Pattern (DP) is a Distinction Model that uses variables and other mathematical symbols for verifying other Distinction Models by substituting variables, and/or replacing constants, with specialized words.

Figure 10:
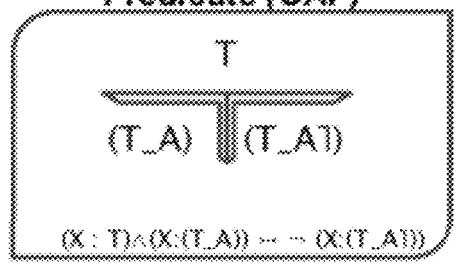
FIG. 10 depicts an example of Distinction Pattern.
Figure 11:
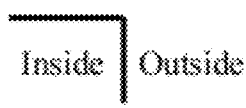
FIG. 11 depicts a distinction between its Inside and its Outside.

An Example of Distinction Pattern is shown in FIG. 10.:

For computing on indications in distinction, LoF uses a planar crossing symbol, named "the Mark", from which we can write 2 indications that are two mutually exclusive lexical elements: one denotes the marked state and the other denotes the unmarked state. A Mark of distinction represents a distinction between its Inside and its Outside in the space in which it appears, as shown in FIG. 11.

In the present computational reasoning and methods, for practical purpose we rewrite LoF arithmetic and algebra in terms of Square Brackets, [ ], as follows:

[Inside]Outside;

An Arrangement is formal language construct that is mathematically defined as follows:
1. A void place ' ' is an Arrangement:
2. A void Square Bracket '[ ]' is an Arrangement;
3. Crossing an existing Arrangement A, '[A]' is an Arrangement, which is called a Package;
4. Reuniting two existing Arrangements A and B, 'A B' is an Arrangement, which is called a Bunch;
5. Only language constructs defined by the four previous lines are
Arrangements.

Given two marks In an Arrangement either one is inside the other, or neither is inside the other; by this mutually exclusivity property, Distinction Arrangements can be considered as complex indications.

Figure 12:
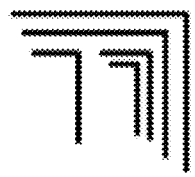
FIG. 12 depicts a distinction arrangement.

Distinction-Based Reasoning (DBR) is defined as the activity (process and result) of LoF distinction making for understanding a domain: DBR is achieved by making distinctions from distinction; In LoF, making distinctions from distinction is represented by the drawing of non-intersecting marks of distinction that is called a Distinction Arrangement (or Arrangement, in short); for example, see FIG. 12.

An Arrangement made of N Marks of distinction presents (N+1) indications: in the previous example, there are 5 Distinctions and 6 indications. In the present computational reasoning and methods, we represent Arrangements as chains of nonoverlapping Square Brackets; the previous example in FIG. 12 can be written in @L-is:

[ [ [] [][] ]]

When making many Distinctions, we must not "re-cut" an already cut boundary:

Distinction-making is not mere division, i.e. cutting into 2 parts:
Division into 2 parts is a mechanical and functional way of cutting, in which N cuts give $2^N$ parts.

Figure 13:
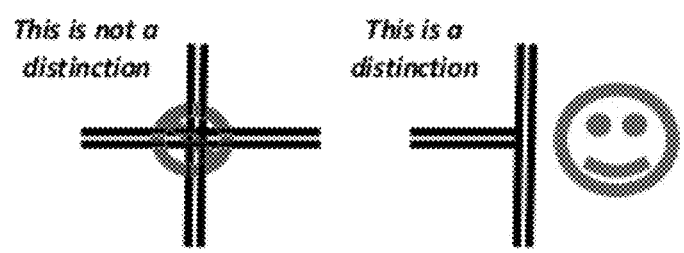
FIG. 13 depicts enumerating distinction making.

Distinction-making is choosing where to cut from which indication we make another distinction without overlapping an existing boundary. This can be presented as shown in FIG. 13. From the On-Line Encyclopedia of Integer Sequences (http://oeis.org/A000081), the numbers ($A_N$) of ways of arranging (N−1) nonoverlapping parentheses, from a Void place, are as follows (for N=1 to 9):

| | | | | N | | | | |
|---|---|---|---|---|---|---|---|---|
| 1 | 2 | 3 | 4 | 5 | 6 | 7 | 8 | 9 |
| $A_N$ 1 | 2 | 4 | 9 | 20 | 48 | 115 | 286 | 719 |

In the present computational reasoning and methods, we replace parentheses by square brackets, which don't change the previous numbers; e.g.:

There are zero way to arrange 0 Square Bracket:;
There are one way to arrange 1 square bracket: [];
There are two ways to arrange 2 square brackets: [ [] ]; [] [];
There are four ways to arrange 3 square brackets: [ [ [] ] ]; [ [] [] ]; [ [] ] []; [] [] [];
etc.

Distinction-Based Reasoning is formalized by building a new Arrangement from existing Arrangements each time a same Indication, in a new verified Distinction Model, is shared:

either with an existing Arrangement A, depending on which side the same Indication X is shared:
by replacing Inside the Square Bracket that maps the new verified Distinction Model, by that existing Arrangement, if the same Indication is inside the new verified Distinction Model and outside said existing Arrangement, namely:
[A]X;
or by replacing Outside said Square Bracket that maps the new verified Distinction Model, by the existing Arrangement, if the same Indication is Outside the new verified Distinction Model and Inside said existing Arrangement, namely:
A[X];
or by reuniting all pairs ([A], [B]) of the existing Arrangements that are Package Arrangements, sharing Outside the same Indication X, namely:
[A] X [B].

Figure 14:
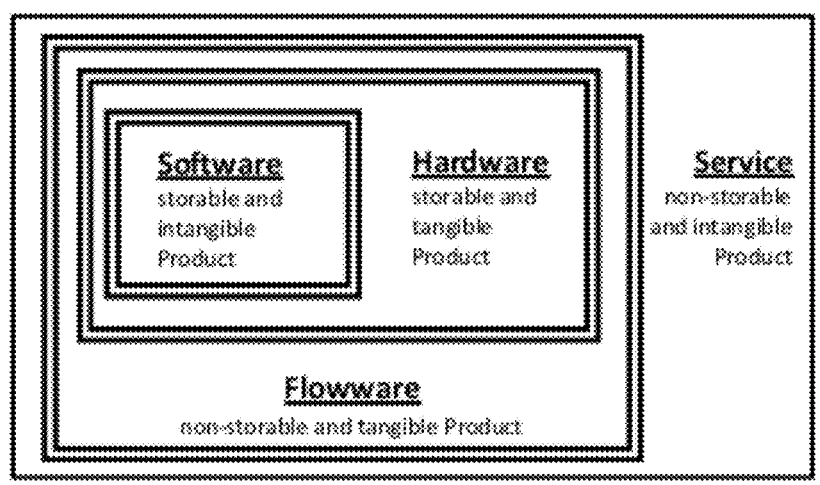
FIG. 14 depicts an example according to the present invention.
Figure 15:
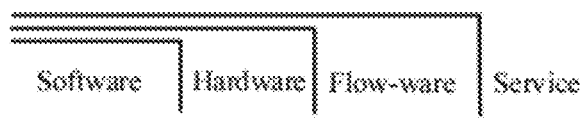
FIG. 15 depicts an example written with LoF Marks of distinction.
Figure 18:
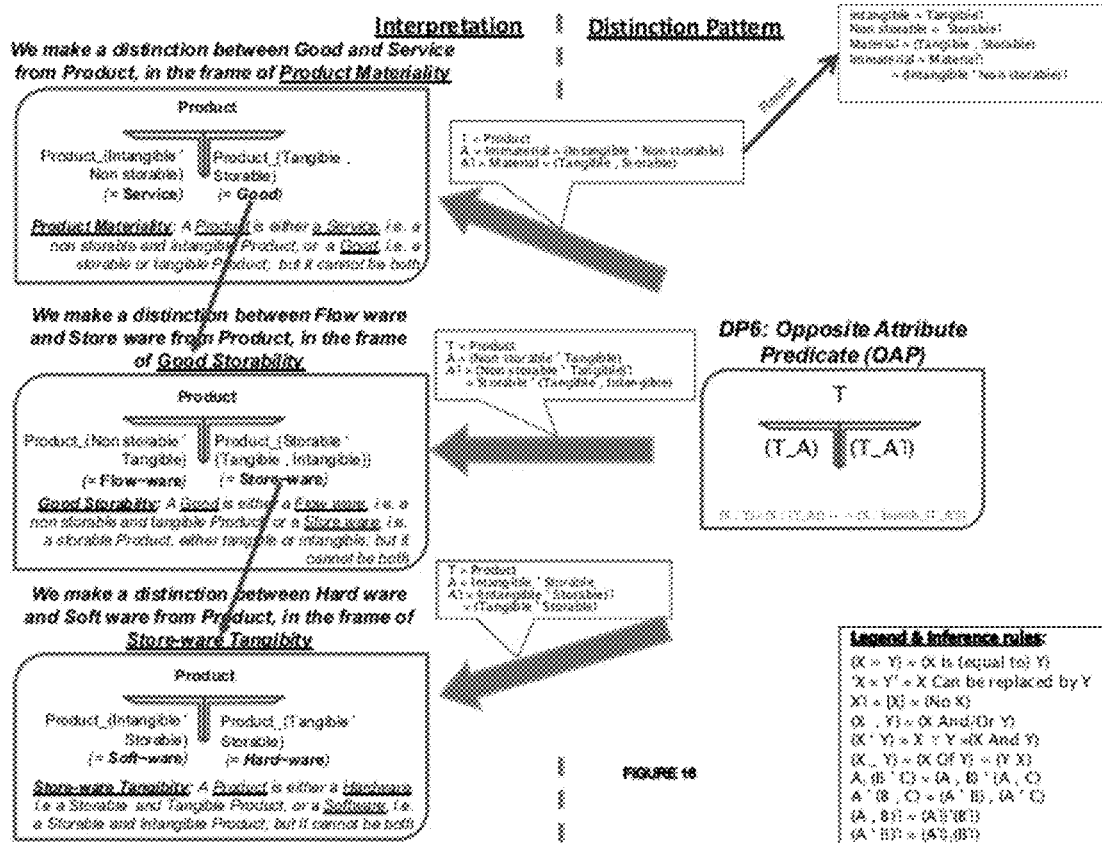

By way of example, the domain "Sorts of Product", with regard to materiality criteria, is identified by the following lexicon:
{product, flow-ware, storable-product, service, hardware, software, tangible, intangible, storable, non-storable];

The underlying Distinction-Based Reasoning is modeled by the following Arrangement:
[[[software] hardware] flow-ware] service;
which is a formalization of the diagram depicted in FIG. 14:

That could also be written with LoF Marks of distinction, as shown in FIG. 15. The question is: how to define mathematically the mutual incompatibility of the 2 indications in a Distinction? The Laws of Form answer is: There is always a difference of value! The make it necessary to compute the value of a formulation and to prove the non equality of value far any case of computation.

Using Symbols in Natural Languages leads to Natural Language Formulations, or (in short) Formulations, which are recursively constructed as follows:
1. A single 0-arity @L-is Symbol is a Formulation;
2. A writing constructed by concatenating one unique N-arity Symbol with N other Formulations, in accordance with the notation, and Type of Value of said unique Symbol, is a Formulation.

For example, the following writing is a Formulation (because of the symbol ' '):
The word 'dog';
In other words, a Formulation is a Natural Languages writing, made by inserting syntactically a symbol in or around one or many other Natural Languages writings.
Note:
A Formulation is not a Formula: there are only symbols in a Formula.
Non-numerical calculus on words consists in:
Substituting Variables Symbols and/or replacing Constants Symbols;
Equating Formulations resulting of previous substitutions and/or replacements.
Calculus on words-meaning is conducted by substituting and replacing, into language constructs, well defined indications by the body of their definition in formal glossaries;
Example:

| father_bart ≈ homer | parent ≈ father, mother |
| mother_bart ≈ marge | (F, G)_X ≈ (F_X), (G_X) | parents_bart ≈ (homer, marge)

FIG. 16 depicts a Distinction-Making Example: Product materiality. Analysis process of Product's materiality, starting point: the CMMI models, we reuse the terminology proposed in the glossary of the Capability Maturity Model Integration—CMMI®:
The CMMI is published by the Software Engineering institute (SEISM) Carnegie Mellon University, USA
The CMMI models provide an integrated process improvement approach that transcends disciplines and provides organizations with the essential elements of effective processes
For more information about the CMMI, see: http://www.sei.cmu.edu/cmmi. Let us start from the glossary of the CMMI for Services V1.3.: " . . . A service is a product that is intangible and non-storable . . . ". As defined, "Products and Services" does not make a distinction:
A service is a kind of product: they are not 2 incompatible subtypes;
To refer to a product that is not a service, we use the word "Good":
Goods group together Products that are Storable And/Or Tangible;
A Service, which is both Intangible and Non-storable, cannot be a Good; and reciprocally;
Goods and Services do make a distinction from Products with regard to products materiality (the domain).
While talking about products materiality, we use 2 opposite attributes, namely:
What is Tangible versus What is Intangible;
What is Storable versus What is Non-storable.
Materiality can be defined from Tangibility and Storability:
Material is defined as being either Tangible And/Or Storable;
Immaterial is logically be defined as being both Intangible And Non-storable.
"Good and Service" make a distinction from Product with regard to products materiality (the domain):
While talking about products materiality, we use 2 opposite attributes, namely:
What is Tangible versus What is Intangible;
What is Storable versus What is Non-storable.
Let us consider Products that are in Goods, i.e. Products that are either Tangible And/or Storable:
If they are Non-Storable,
then they are necessarily Tangible; else
they can be either Tangible or Intangible.
In that frame (Good Storability), we make a distinction between:
A "Flow-ware" that is a Non-storable and Tangible Product;
A "Store-ware" that is a Storable Product, either Tangible or intangible.
Let us consider Products that are in Store-ware, i.e. Products that are Storable:
In that frame (Store-ware Tangibity), we make a distinction between:
A "Hard ware" that is a Storable and Tangible Product;
A "Soft ware" that is a Storable and Intangible Product.
Finally, we set up 4 mutually exclusive subtypes of product, namely:
1. A service is a non-storable and intangible product; ex: An Internet search is a service;
2. A software is a storable and intangible product; ex: "Microsoft Word" is a software;
3. A flow-ware is a non-storable and tangible product; ex: Electricity is a flow-ware;
4. A hardware is a storable and tangible product; ex: A book is a hardware.

The next step is to formalize the 2 opposite attributes, Tangible ‖Intangible and Storable‖Non-storable, can be formalized:
intangible≈tangible];
non~storable≈storable];
Where
The symbol <<]>> has the artificial meaning of <<opposite of attribute, or non->>
The symbol <<≈>> has the artificial meaning of <<can be replaced by >>
The 4 subtypes of products can be asserted:
product_(intangible ' non-storable)≈service
product_(tangible ' storable)≈hardware
product_(intangible ' storable)≈software
product_(tangible ' non-storable)≈flow~ware
Where
The symbol <<'>> has the artificial meaning of <<and>>
The 3 bunches of products can be asserted:
(software, hardware)≈store~ware;
(store ware, flow ware)≈good;
(good, service)≈product;
Where
The symbol <<,>> has the artificial meaning of <<and/or >>
The 4 Subtypes of products can be formalized:
software: product
service: product
hardware: product
flow-ware: product
Where
The symbol <<:>> has the artificial meaning of <<is a>>.
The result is Words that are made as precise as numbers.
The Materiality Lexicon
1. Intangible;
2. Tangible;
3. Non storable;
4. Storable;
5. Material;
6. Immaterial.
Product Lexicon:
1. Product;
2. Service;
3. Good;
4. Flow ware;
5. Store ware;
6. Hard ware;
7. Soft ware.

The present invention makes clear-cut distinctions for establishing the scope of an intended Domain:
A Domain is correlatively scoped by its applicable Distinctions:
There is no universal distinctions: a Distinction is made by an expert only if it is applicable in its expertise domain
Identify a handful of basic concepts and their related indications:
Essential Knowledge in a Domain is conveyed by the lexicon made by reasoning logically from the Indications in Distinctions;
Provide precise definitions:
Distinction-Based Reasoning implies defining both an indication and its related counter-indication; this avoids defining words from themselves, directly or indirectly;
Support mutual understanding, while working in the domain, by respecting THE meaning of basic concepts:
In a given Domain, never use words whose meaning encompasses the 2 indications of a distinction that is applicable to the domain.

It should be understood that the foregoing relates to preferred embodiments of the invention and that modifications may be made without departing from the spirit and scope of the invention as set forth in the following claims.

I claim:

1. A computer implemented method of constructing formal definitions in intelligent glossaries for interpreting text, said method comprising the steps of:
providing at least one distinction, wherein each distinction has a boundary, an indication, a counter-indication and a frame;
modeling each said distinction as a diagram to provide a distinction model;
verifying each distinction model as being an instantiation of a generic distinction pattern to provide a verified distinction model;
providing at least one arrangement, wherein each arrangement is made of nonintersecting marks of distinction containing indications from said verified distinction model;
writing at least one formulation for each indication appearing in said verified distinction model and arrangement, providing well-founded indications;
calculating precise formulations in natural language from well-founded indications by performing at least one of the steps of substituting variables symbols and replacing constants symbols to transform imprecise formulations into precise formulations;
selecting a definition type, wherein said definition type is selected from the group consisting of terminologies, assertions, and theorems;
embedding at least one said precise formulation and definition type as a formal definition in an intelligent glossary to provide computerized semantic systems of intelligent glossaries.

2. A computer implemented method as in claim 1, wherein said distinction is a cognitive activity made by a human person and received in a computing device; and
distinction-making contributes to clarify a domain, as a knowledge unit.

3. A computer implemented method as in claim 1, wherein said boundary, indication, counter-indication and frame are named by specialized words, identifiers or symbols that belong to the specialized natural language of the knowledge domain.

4. A computer implemented method as in claim 3, wherein the meaning of said specialized words, identifiers or symbols given to the indication and the counter-indication, are two mutually incompatible ideas in said knowledge domain.

5. A computer implemented method as in claim 3, wherein the meaning of said specialized word, identifier or symbol given to the boundary, both separates and reunites the meaning of the indication and the counter-indication.

6. A computer implemented method as in claim 3, wherein the meaning of said specialized word, identifier or symbol given to the frame, delimits said knowledge domain.

7. A computer implemented method as in claim 1, wherein said distinction model is a planar diagram describing the underlying said distinction:
the boundary is a shorthand of a closed line without leakage;
the indications and counter-indication are the two sides interconnected by said boundary; and
the frame is a line that delimits the distinction model as a whole.

8. A computer implemented method as in claim 7, wherein many underlying distinctions may share the same distinction model.

9. A computer implemented method as in claim 7, wherein the boundary, indication, counter-indication and frame of said distinction model are labelled by the respective specialized words, identifiers or symbols of the underlying said distinction.

10. A computer implemented method as in claim 1, wherein at least one said generic distinction have specialized words that can be replaced by less generic specialized words in the same natural language.

11. A computer implemented method as in claim 1, further comprising the steps of writing formulations in natural language by inserting syntactically a at least one identifier or symbol in or around other natural language writings.

12. A computer implemented method as in claim 1, wherein said generic distinction have at least one variable symbol that can be substituted by a given formulation in natural language.

13. A computer implemented method as in claim 1, wherein said distinction pattern is the distinction model of a generic distinction.

14. A computer implemented method as in claim 1, wherein said instantiation mechanism is a many-to-one "IS A" mapping, from the distinction model to the distinction pattern, of their respective labels of:
- boundary;
- indication;
- counter-indication; and
- frame.

15. A computer implemented method as in claim 1, wherein non-overlapping square brackets are the circumfix symbols that represent planar nonintersecting marks of distinction between their inside and their outside, in the arrangement in which they appear, namely;
[inside] outside.

16. A computer implemented method as in claim 15, wherein an arrangement is a formal language construct inductively defined as follows:
1. writing a void place "in the plane, i.e. there is no distinction, is an arrangement;
2. writing a square bracket, with nothing inside, '[ ]' is an arrangement;
3. crossing an existing arrangement A, '[A]' is an arrangement, which is called a package;
4. reuniting two existing arrangements A and B, 'A B' is an arrangement, which is called a bunch; and
only language constructs defined by the four previous lines are arrangements.

17. A computer implemented method as in claim 15, wherein an arrangement with a number N of square brackets, is identified as one of the mathematically defined ways of arranging N–1 non-overlapping square bracket from a void place (the first arrangement), namely:
there are zero ways to arrange 0 Square Bracket: ;
there is one way to arrange 1 Square Bracket: [];
there are two ways to arrange 2 Square Brackets: [[]]; [] [];
there are four ways to arrange 3 Square Brackets: [[[]]]; [[][]]; [[]] []; [] [] [].

18. A computer implemented method as in claim 15, wherein a new arrangement is built each time a new verified distinction model, is shared with existing arrangements:
either with a unique existing arrangement A, depending on which side a same indication label, in said new verified distinction model, is shared
by replacing inside the square bracket that maps said new verified distinction model, by said existing arrangement, if said same indication label is inside said new verified distinction model and outside said existing arrangement, namely:
[A] X;
or by replacing outside said square bracket that maps said new verified distinction model, by said existing arrangement, if said same indication is outside said new verified distinction model and inside said existing arrangement, namely:
A [X];
or by reuniting all pairs ([A], [B]) of said existing arrangements that are packages and that share outside said same boundary label X in said new verified distinction model, namely: [A] X [B].

19. A computer implemented method as in claim 1, further comprising the step of assigning formulations of logical and mathematical properties to specialized word, identifier or symbol occurring inside said formally verified distinction model.

20. A computer implemented method as in claim 19, further comprising the steps of: calculating precise formulations in natural language from well-founded indications by performing at least one of the steps of substituting variables symbols and replacing constants symbols to transform imprecise formulations into precise formulations.

21. A computer implemented method as in claim 20, further comprising the steps of verifying formulations of logical and mathematical properties from previous calculations:
mutual incompatibility between the formulation of the indication and the formulation of the counter-indication;
commonality of the formulation of the boundary that both separates and reunites the formulation of the indication and the formulation of the counter-indication;
completeness of the formulation of the frame.

22. A computer implemented method as in claim 1, further comprising the steps of:
producing sets of formal glossaries to provide a semantic system of intelligent glossaries.

23. A method as in claim 1, further comprising the steps of:
validating said semantic system of intelligent glossaries using domain-specific texts written by inserting specialized words, identifiers or symbols.

24. A method as in claim 1, wherein said step of writing at least one formal definition in a computer according to said formally verified distinction model and said definition type is further comprising the steps of:
providing an alphabet, at least one symbol for constructing lexical elements, and at least one syntactic element built on said alphabet, said lexical elements, and said at least one symbol on at least one computer;
determining, by said at least one computer, a sort of value, an arity, a notation, and a type for each said syntactic element, to provide well-formed syntactic elements and meaningless syntactic elements;
building, by said at least one computer, formal definitions from said well-formed syntactic elements, and determining a type for each said formal definition to provide a list of terminologies, assertions, theorems;
building, by said at least one computer, at least one formal glossary as ordered sets of said formal definitions;
providing, on said at least one computer, an output of at least one said formal glossary, and a related minimal lexicon;

parsing, verifying and normalizing each said formal definition, by said at least one computer, from said formal glossary, to provide a list of defined lexical elements and undefined lexical elements;

accepting at least one input, wherein said at least one input includes at least one question containing at least one well-formed syntactic element;

retrieving for each said defined lexical element, at least one formal definition from said at least one formal glossary;

applying said at least one formal definition to said defined lexical elements according to at least one interpretation process to provide at least one meaningful value;

coding each said at least one input and said at least one meaningful value as a new questions and answers definition; and saving said new questions and answers definitions in said formal glossary in said computer, to provide an intelligent glossary.

\* \* \* \* \*